(12) United States Patent
Aramata et al.

(10) Patent No.: US 7,790,316 B2
(45) Date of Patent: Sep. 7, 2010

(54) SILICON COMPOSITE PARTICLES, PREPARATION THEREOF, AND NEGATIVE ELECTRODE MATERIAL FOR NON-AQUEOUS ELECTROLYTE SECONDARY CELL

(75) Inventors: Mikio Aramata, Usui-gun (JP); Satoru Miyawaki, Usui-gun (JP); Hirofumi Fukuoka, Usui-gun (JP); Kazuma Momii, Usui-gun (JP); Kouichi Urano, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1238 days.

(21) Appl. No.: 11/085,518

(22) Filed: Mar. 22, 2005

(65) Prior Publication Data

US 2005/0214644 A1  Sep. 29, 2005

(30) Foreign Application Priority Data

Mar. 26, 2004 (JP) ............................. 2004-093074
Mar. 26, 2004 (JP) ............................. 2004-093169

(51) Int. Cl.
*H01M 4/58* (2010.01)
*H01B 1/04* (2006.01)
*C01B 33/12* (2006.01)
*C01B 33/00* (2006.01)
*C01B 31/36* (2006.01)
*C01B 21/068* (2006.01)

(52) U.S. Cl. .................. 429/218.1; 252/502; 252/182.1; 423/335

(58) Field of Classification Search .................. 423/335
See application file for complete search history.

(56) References Cited

U.S. PATENT DOCUMENTS

| 4,248,814 | A | * | 2/1981 | Yajima et al. ............... 264/624 |
| 4,671,909 | A | * | 6/1987 | Torobin ....................... 264/43 |
| 4,689,252 | A | * | 8/1987 | Lebrun et al. ............... 427/228 |
| 5,395,711 | A | | 3/1995 | Tahara et al. |
| 5,478,671 | A | | 12/1995 | Idota |
| 5,655,212 | A | * | 8/1997 | Sekhar et al. ............... 428/552 |
| 5,686,138 | A | * | 11/1997 | Fujimoto et al. ............ 429/326 |
| 6,066,414 | A | | 5/2000 | Imoto et al. |
| 6,211,307 | B1 | * | 4/2001 | Iwabuchi et al. ............ 525/477 |
| 6,235,427 | B1 | * | 5/2001 | Idota et al. ............... 429/218.1 |
| 6,383,686 | B1 | | 5/2002 | Umeno et al. |
| 6,589,696 | B2 | * | 7/2003 | Matsubara et al. ........ 429/231.8 |
| 6,638,662 | B2 | * | 10/2003 | Kaneda et al. ............ 429/231.8 |
| 6,733,922 | B2 | * | 5/2004 | Matsubara et al. ........ 429/231.8 |
| 6,893,621 | B2 | * | 5/2005 | Fukuoka et al. .............. 423/332 |

(Continued)

FOREIGN PATENT DOCUMENTS

JP         5-174818         7/1993

(Continued)

*Primary Examiner*—Randy Gulakowski
*Assistant Examiner*—Robert Loewe
(74) *Attorney, Agent, or Firm*—Oblon, Spivak, McClelland, Maier & Neustadt, L.L.P.

(57) ABSTRACT

Silicon composite particles are prepared by sintering primary fine particles of silicon, silicon alloy or silicon oxide together with an organosilicon compound. Sintering of the organosilicon compound results in a silicon-base inorganic compound which serves as a binder. Each particle has the structure that silicon or silicon alloy fine particles are dispersed in the silicon-base inorganic compound binder, and voids are present within the particle.

17 Claims, 7 Drawing Sheets

U.S. PATENT DOCUMENTS

| | | | |
|---|---|---|---|
| 2002/0041970 A1* | 4/2002 | Gaynor | 428/447 |
| 2002/0074565 A1* | 6/2002 | Flagan et al. | 257/200 |
| 2003/0215711 A1* | 11/2003 | Aramata et al. | 429/218.1 |
| 2003/0235762 A1 | 12/2003 | Fukui et al. | |
| 2004/0106040 A1* | 6/2004 | Fukuoka et al. | 429/212 |

FOREIGN PATENT DOCUMENTS

| | | |
|---|---|---|
| JP | 6-60867 | 3/1994 |
| JP | 10-294112 | 11/1998 |
| JP | 11-102705 | 4/1999 |
| JP | 2997741 | 11/1999 |
| JP | 2000-215887 | 8/2000 |
| JP | 2000-243396 | 9/2000 |
| JP | 2002-42806 | 2/2002 |
| JP | 2004-22433 | 1/2004 |
| JP | 2004-47404 | 2/2004 |
| JP | 2004-335334 | 11/2004 |
| JP | 2004-335335 | 11/2004 |

\* cited by examiner

100nm~10μm

PARTICLE

PARTICLE

SILICON COMPOSITE PARTICLES, PREPARATION THEREOF, AND NEGATIVE ELECTRODE MATERIAL FOR NON-AQUEOUS ELECTROLYTE SECONDARY CELL

CROSS-REFERENCE TO RELATED APPLICATION

This non-provisional application claims priority under 35 U.S.C. §119(a) on Patent Application Nos. 2004-093074 and 2004-093169 filed in Japan on Mar. 26, 2004 and Mar. 26, 2004, respectively, the entire contents of which are hereby incorporated by reference.

This invention relates to silicon or silicon-carbon composite particles useful as a high capacity, negative electrode active material in lithium ion secondary cells, a method for preparing the same, and a negative electrode material for use in non-aqueous electrolyte secondary cells.

BACKGROUND OF THE INVENTION

With the recent rapid progress of potable electronic equipment and communication equipment, secondary batteries having a high energy density are strongly desired from the standpoints of economy and size and weight reduction. Prior art known attempts for increasing the capacity of such secondary batteries include the use as the negative electrode material of oxides of V, Si, B, Zr, Sn or the like or compound oxides thereof (JP-A 5-174818, JP-A 6-60867 corresponding to U.S. Pat. No. 5,478,671), melt quenched metal oxides (JP-A 10-294112), silicon oxide (Japanese Patent No. 2,997,741 corresponding to U.S. Pat. No. 5,395,711), and $Si_2N_2O$ or $Ge_2N_2O$ (JP-A 11-102705 corresponding to U.S. Pat. No. 6,066,414). Also, for the purpose of imparting conductivity to the negative electrode material, mechanical alloying of SiO with graphite followed by carbonization (JP-A 2000-243396 corresponding to U.S. Pat. No. 6,638,662), coating of Si particle surfaces with a carbon layer by chemical vapor deposition (JP-A 2000-215887 corresponding to U.S. Pat. No. 6,383,686), coating of silicon oxide particle surfaces with a carbon layer by chemical vapor deposition (JP-A 2002-42806), and coating of silicon or silicon alloy particles with a polyimide binder followed by sintering (JP-A 2004-22433 corresponding to U.S. 2003-0235762A) are known.

These prior art methods are successful in increasing the charge/discharge capacity and the energy density of secondary batteries, but fall short of the market demand and are not satisfactory because of insufficient cycle performance, a substantial volume change of the negative electrode film itself upon charging/discharging cycles, and separation from the current collector.

Some of these problems can be solved by carbon surface coating by thermal CVD. The charge/discharge capacity is more than the necessity at the present when a balance thereof with the low capacity of current positive electrodes is taken into account. In some cell applications, there is a need for a material having better cycle performance even at some expense of capacity. It would be desirable to have a negative electrode active material which is based on silicon and exhibits better cycle performance despite some reduction in energy density.

More particularly, Japanese Patent No. 2,997,741 describes a high capacity electrode using silicon oxide as the negative electrode material in a lithium ion secondary cell. As long as the present inventors have empirically confirmed, the performance of this cell is yet unsatisfactory due to an increased irreversible capacity on the first charge/discharge cycle and a practically unacceptable level of cycle performance. With respect to the technique of imparting conductivity to the negative electrode material, JP-A 2000-243396 provides insufficient conductivity since a uniform carbon coating is not formed due to solid-solid fusion. JP-A 2000-215887 is successful in forming a uniform carbon coating, but the negative electrode material based on silicon experiences extraordinary expansion and contraction upon absorption and desorption of lithium ions and as a result, fails to withstand practical service. At the same time, the cycle performance declines, and the charge/discharge quantity must be limited in order to prevent such decline. In JP-A 2002-42806, an improvement in cycle performance is ascertainable, but the capacity gradually decreases with the repetition of charge/discharge cycles and suddenly drops after a certain number of cycles, because of precipitation of silicon micro-crystals, the under-developed structure of the carbon coating and insufficient fusion of the carbon coating to the substrate. This negative electrode material is yet insufficient for use in secondary batteries.

SUMMARY OF THE INVENTION

An object of the invention is to provide silicon composite or silicon-carbon composite particles from which a lithium ion secondary cell negative electrode having improved cycle performance can be manufactured, a method for preparing the same, and a negative electrode material for use in non-aqueous electrolyte secondary cells.

The inventors have discovered a silicon composite which has improved cycle performance and is minimized in the volume change upon charge/discharge cycles which has been a problem with the prior art silicon-based negative electrode active material, and is effective as an active material for a non-aqueous electrolyte secondary cell negative electrode.

The inventors have also discovered a silicon-carbon composite which has improved cycle performance and is minimized in the volume change upon charge/discharge cycles which has been a problem with the prior art silicon-based negative electrode active material, and is effective as an active material for use in a non-aqueous electrolyte secondary cell negative electrode, ensuring that a lithium ion secondary cell negative electrode is prepared which has a significantly higher energy density than carbon-based negative electrode materials and better cycle performance than prior art silicon-based negative electrode materials despite some reduction of energy density as compared with the high energy density inherent to silicon itself.

As previously described, the development of an electrode material having a high charge/discharge capacity is a great concern, and many engineers have been engaged in research. Under the circumstances, silicon, silicon oxides (SiOx) and silicon alloys, because of their high capacity, draw a great attention as the lithium ion secondary cell negative electrode active material. However, since they undergo considerable degradation upon repetition of charge/discharge cycles (that is, poor cycle performance) and since silicon oxides have low initial efficiency, most of them have not reached the practical level. Making investigations toward improved cycle performance and initial efficiency from this point of view, the inventor discovered that silicon oxide powder is significantly improved in performance over the prior art by coating the particles with carbon by thermal chemical vapor deposition (CVD), as described in JP-A 2004-047404 (US-A 2003-0215711, EP-A 1363341). There was still a need for further improvements in long-term stability and initial efficiency.

To know the reason why a rapid drop of charge/discharge capacity occurs after a number of charge/discharge cycles when silicon or silicon oxide particles coated with carbon by CVD are used as the negative electrode active material in a lithium ion secondary cell, the inventor studied the structure of the CVD treated silicon or silicon oxide. It was found that large volume changes occur upon occlusion and release of a large quantity of lithium, and particles are broken thereby. Silicon or a silicon alloy originally having a low conductivity undergoes volume expansion by occlusion of lithium, so that the conductivity of the electrode itself lowers. Additionally, the negative electrode film can separate from the current collector. As a result, the current collecting capability lowers to impede movement of lithium ions within the electrode, incurring losses of cycle performance and efficiency. Since the silicon oxide structure which is amorphous from the crystallographic aspect is left, the oxygen of silicon oxide captures lithium as lithium oxide, which contributes to a further reduction in the initial efficiency.

Based on these findings, the inventors made a study on the stable structure which mitigates the volume change upon occlusion and release of lithium. It has been found that by covering surfaces of fine particles of silicon or silicon alloy with an inert robust substance, for example, an Si—C, Si—C—O or Si—C—N composite and granulating into particles while introducing voids in the particle interior, there are obtained silicon composite particles which have overcome the above-discussed problems of lithium ion secondary cell negative electrode active material, and has a stabilized high charge/discharge capacity and significantly improved performance and efficiency of charge/discharge cycles. By finely dispersing fine particles of silicon or silicon alloy in a heat-curable organosilicon compound capable of providing a high degree of crosslinking, for example, a siloxane composition which is addition reactive through hydrosilylation, a polyfunctional silane/siloxane, (poly)silazane or polycarbosilane, heat curing, then firing in an inert atmosphere to become inorganic, and comminuting again, there are obtained silicon composite particles having improved properties like cycle performance. To improve the adherence between silicon or silicon alloy fine particles and the organosilicon compound, the previous surface treatment of the fine particles with silane coupling agents or the like to be hydrophobic is effective. Since the silicon composite particles as prepared above are not conductive, they are mixed with conductive carbon powder to form a mixture useful as a negative electrode active material. Particularly when the silicon composite particles as prepared above are coated with carbon by thermal CVD, the performance of composite particles is significantly improved over the prior art.

It has also been found that by distributing fine particles of silicon or silicon alloy around carbon fine particles such as globular or flaky graphite fine particles as nuclei, covering surfaces of the silicon or silicon alloy fine particles with an inert robust substance, for example, an Si—C, Si—C—O or Si—C—N composite and granulating into particles while introducing voids in the particle interior, there are obtained silicon-carbon composite particles which have overcome the above-discussed problems of lithium ion secondary cell negative electrode active material, and has a stabilized high charge/discharge capacity and significantly improved performance and efficiency of charge/discharge cycles. Although the silicon-carbon composite particles as prepared above are somewhat conductive, the silicon-carbon composite particles are coated with carbon by thermal CVD whereby the performance of composite particles is significantly improved over the prior art.

In a first aspect, the invention provides silicon composite particles prepared by sintering primary fine particles of silicon, silicon alloy or silicon oxide together with an organosilicon compound or a mixture thereof. Sintering of the organosilicon compound or mixture thereof forms a silicon-base inorganic compound which serves as a binder. Each particle has the structure that silicon or silicon alloy fine particles are dispersed in the silicon-base inorganic compound binder, and voids are present within the particle.

In a preferred embodiment, the primary fine particles of silicon, silicon alloy or silicon oxide have a size of 100 nm to 10 μm, and the silicon-base inorganic compound is an Si—C—O or Si—C—N composite, $SiN_x$, $SiO_y$, $SiC_z$ or a mixture thereof wherein x, y and z are positive numbers in the range: $0 < x \leq 4/3$, $0 < y \leq 2$, and $0 < z \leq 1$.

In a variant of the first aspect, the invention provides silicon-carbon composite particles which are prepared by sintering primary fine particles of silicon, silicon alloy or silicon oxide and primary fine particles of carbon together with an organosilicon compound or a mixture thereof. Sintering of the organosilicon compound or mixture thereof forms a silicon-base inorganic compound which serves as a binder. Each particle has the structure that silicon or silicon alloy fine particles and carbon fine particles are dispersed in the silicon-base inorganic compound binder, and voids are present within the particle.

In a preferred embodiment, the primary fine particles of silicon, silicon alloy or silicon oxide have a size of 100 nm to 10 μm, the primary fine particles of carbon have a size of 100 nm to 20 μm, and the silicon-base inorganic compound is an Si—C—O or Si—C—N composite, $SiN_x$, $SiO_y$, $SiC_z$ or a mixture thereof wherein x, y and z are positive numbers in the range: $0 < x \leq 4/3$, $0 < y \leq 2$, and $0 < z \leq 1$.

The primary fine particles of carbon are typically natural or synthetic graphite in globular or flake form.

The organosilicon compound or mixture thereof is preferably a reactive organosilicon compound having a crosslinkable group or a curable polysiloxane composition. The preferred reactive organosilicon compound having a crosslinkable group is one or more silane or siloxane compounds having the general formulae (1) to (5) defined later or a silane or siloxane represented by the average formula: $C_hH_i\text{-}SiO_jN_k$ wherein h, i and j are positive numbers, k is 0 or a positive number, and (h-j) is more than 0, and having at least one crosslinkable site per 4 silicon atoms. The preferred curable polysiloxane composition is an addition-curable organopolysiloxane composition.

Preferably the silicon composite particles or silicon-carbon composite particles have a void content of 1 to 70% by volume.

In a preferred embodiment, the silicon or silicon-carbon composite particles are surface coated with carbon, yielding conductive silicon or silicon-carbon composite particles.

In a second aspect, the invention provides a method for preparing silicon composite particles comprising the steps of sintering primary fine particles of silicon, silicon alloy or silicon oxide together with an organosilicon compound or a mixture thereof, and granulating into silicon composite particles each having the structure that silicon or silicon alloy fine particles are dispersed in a silicon-base inorganic compound resulting from sintering of the organosilicon compound or mixture thereof and serving as a binder, and voids are present within each particle.

In a variant of the second aspect, the invention provides a method for preparing silicon-carbon composite particles, comprising the steps of sintering primary fine particles of silicon, silicon alloy or silicon oxide and primary fine particles of carbon together with an organosilicon compound or a mixture thereof, and granulating into silicon-carbon composite particles each having the structure that silicon or silicon alloy fine particles and carbon fine particles are dispersed in a silicon-base inorganic compound resulting from sintering of the organosilicon compound or mixture thereof and serving as a binder, and voids are present within each particle.

In a preferred embodiment wherein the organosilicon compound or mixture thereof is a reactive organosilicon compound having a crosslinkable group or a curable polysiloxane composition, the method involves the steps of mixing the reactive organosilicon compound or curable polysiloxane composition with primary fine particles of silicon or silicon alloy, effecting heat curing or catalytic reaction for curing into a crosslinked product, heating and sintering the crosslinked product at a temperature in the range of 500 to 1,400° C. in an inert gas stream, to become inorganic, and comminuting the inorganic product to a size of 0.5 to 30 μm.

In a further preferred embodiment, the primary fine particles of silicon or silicon alloy are previously treated with at least one surface treating agent selected from a silane coupling agent, a (partial) hydrolytic condensate thereof, a silylating agent, and a silicone resin.

The method of preparing conductive silicon-carbon composite particles involves the step of heat treating the silicon or silicon-carbon composite particles prepared by the above method, in an atmosphere containing an organic matter gas and/or vapor at a temperature of 800 to 1,400° C., for thereby coating surfaces of the silicon or silicon-carbon composite particles with carbon.

In a third aspect, the invention provides a negative electrode material for a non-aqueous electrolyte secondary cell, comprising the silicon or silicon-carbon composite particles defined above. The preferred negative electrode material for a non-aqueous electrolyte secondary cell comprises a mixture of the silicon or silicon-carbon composite particles defined above and 1 to 60% by weight of a conductive agent, the mixture having a total carbon content of 25 to 90% by weight.

The silicon or silicon-carbon composite particles of the invention are used to form a negative electrode material for a non-aqueous electrolyte secondary cell, imparting good cycle performance thereto.

DESCRIPTION OF THE PREFERRED EMBODIMENTS

Although silicon-base materials have a high charge/discharge capacity of several folds over that of graphite-base materials which are the current mainstream negative electrode active materials for lithium ion secondary cells, they suffer from a substantial performance drop after repeated charge/discharge cycles. The present invention pertains to silicon composite particles which have improved the cycle performance and efficiency of silicon-base materials. Silicon composite particles are prepared by sintering primary fine particles of silicon, silicon alloy or silicon oxide together with an organosilicon compound or a mixture thereof. As a result of sintering, the organosilicon compound or mixture thereof is converted to a silicon-base inorganic compound, and the material is granulated. Each particle has the structure that silicon or silicon alloy fine particles are dispersed in the silicon-base inorganic compound serving as a binder, and voids are present within the interior. The particles typically have an average particle size of 0.5 to 30 μm.

Figure 1:
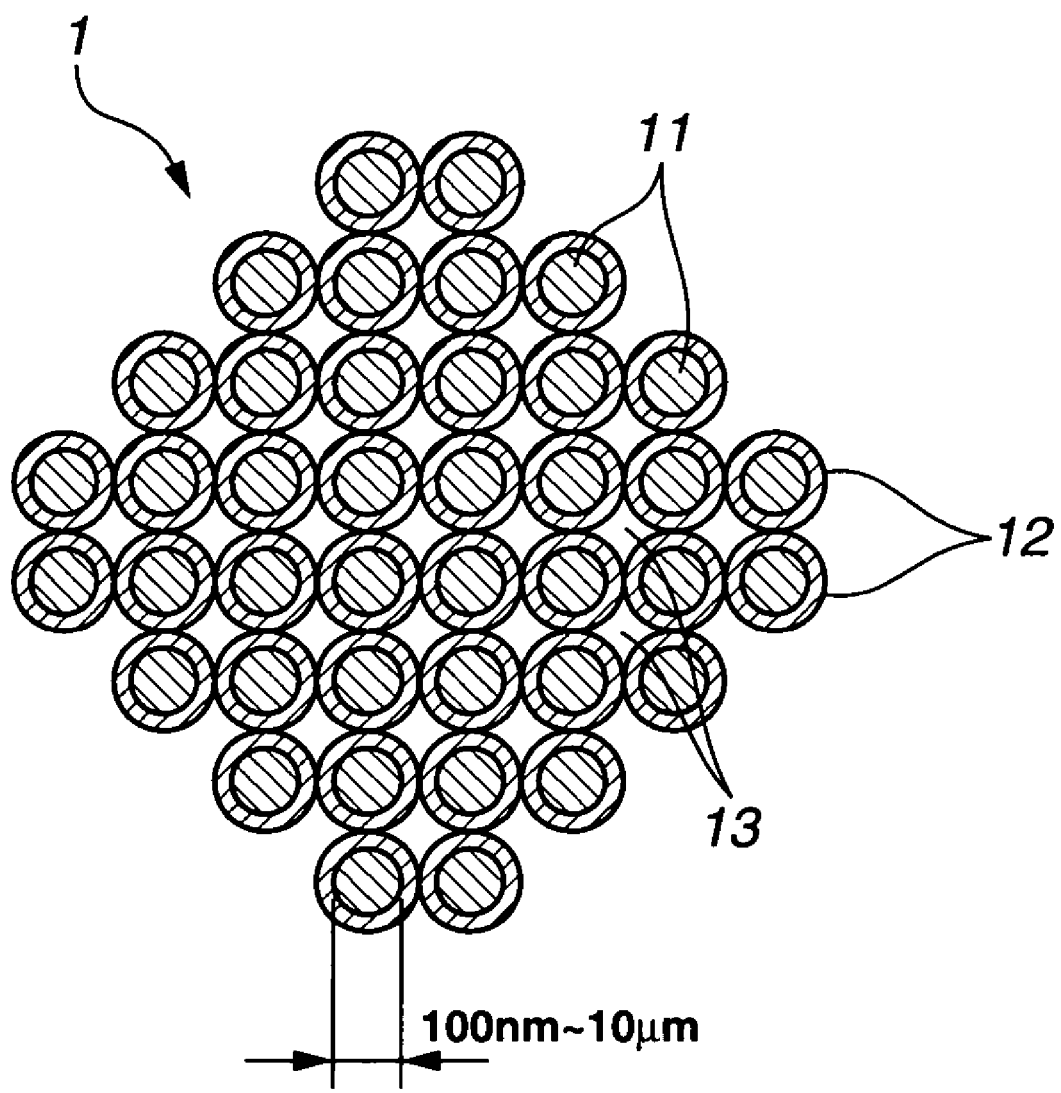
FIG. 1 diagrammatically illustrates a silicon composite particle of the invention.

FIG. 1 diagrammatically illustrates a silicon composite particle 1 comprising a plurality of silicon or silicon alloy fine particles 11, a silicon-base inorganic compound 12 serving as a binder for covering the fine particles 11, and voids or interstices 13 between the fine particles.

In a preferred embodiment, surfaces of the particles are coated with carbon, more preferably such that the particle surfaces are at least partially fused to carbon.

In another embodiment, the invention provides silicon-carbon composite particles which have improved cycle performance and efficiency and has mitigated a volume change upon charge/discharge cycles. Silicon-carbon composite particles are prepared by sintering primary fine particles of silicon, silicon alloy or silicon oxide and primary fine particles of carbon together with an organosilicon compound or a mixture thereof. As a result of sintering, the organosilicon compound or mixture thereof is converted to a silicon-base inorganic compound, and the material is granulated. Each particle has the structure that silicon or silicon alloy fine particles are dispersed in the silicon-base inorganic compound serving as a binder and distributed around carbon fine particles serving as nuclei, and voids are present within the particle interior. The particles typically have an average particle size of 0.5 to 30 μm.

Figure 2:
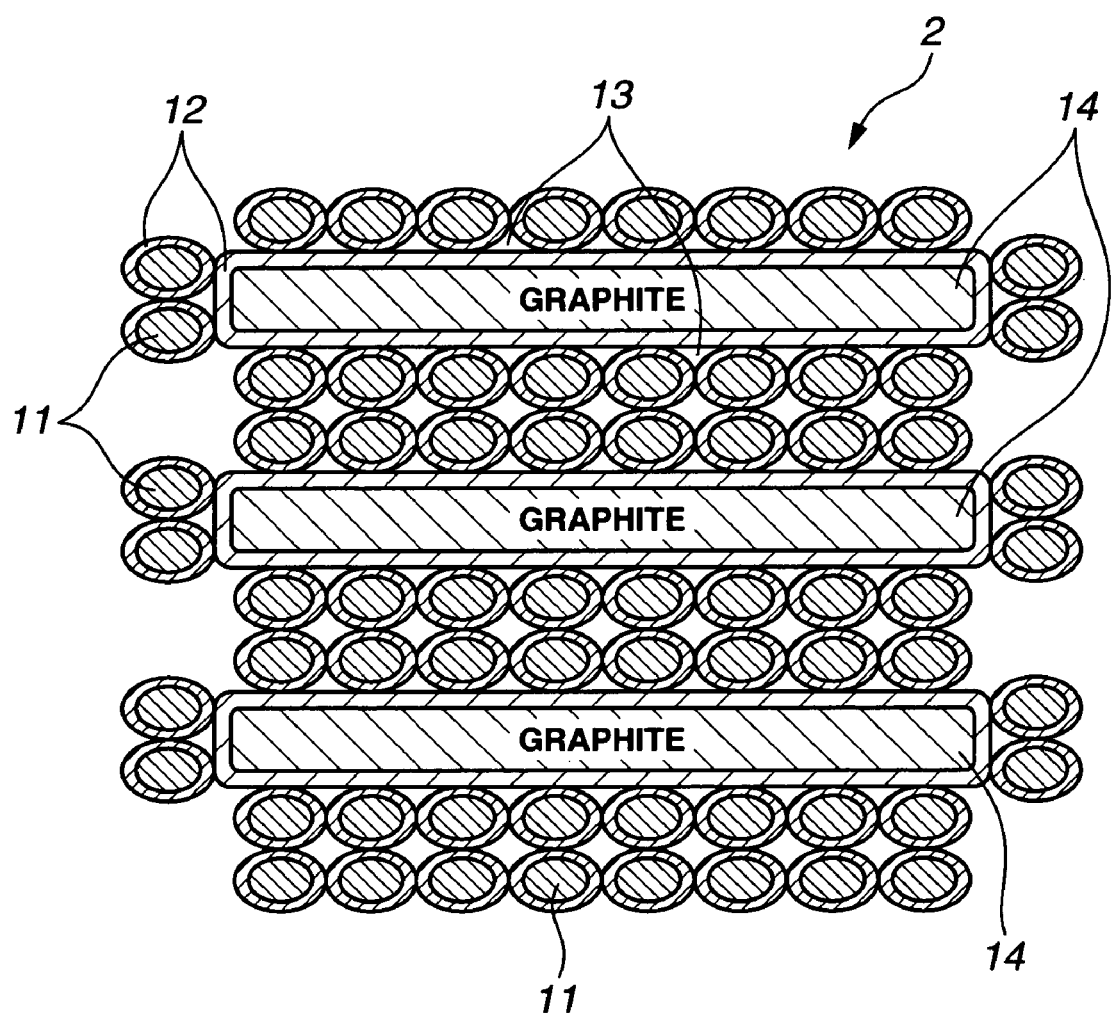
FIG. 2 diagrammatically illustrates a silicon-carbon composite particle of the invention.

FIG. 2 diagrammatically illustrates a silicon-carbon composite particle 2 comprising a plurality of carbon fine particles 14, a plurality of silicon or silicon alloy fine particles 11, a silicon-base inorganic compound 12 serving as a binder for covering the silicon or silicon alloy fine particles 11 and carbon fine particles 14, and voids or interstices 13 between the fine particles, wherein the carbon fine particles 14 are surrounded by the silicon or silicon alloy fine particles 11.

In a preferred embodiment, surfaces of the particles are coated with carbon by thermal CVD, thereby imparting a higher conductivity to the surfaces.

Also preferably the silicon composite and silicon-carbon composite of the invention satisfy the following characteristics.

(i) On analysis by x-ray diffraction (Cu—Kα) using copper as the counter cathode, a diffraction peak attributable to Si(111) is observed as centering near 2θ=28.4°. The silicon crystal grains have a size of at least 2 nm, especially at least 5 nm as determined by Scherrer equation based on the spread of the diffraction peak although the size largely differs with the identity of raw material.

(ii) A quantity of zero-valent silicon capable of occlusion and release of lithium ions in a lithium ion secondary cell negative electrode can be determined from a quantity of hydrogen gas generated upon reaction with an alkali hydroxide according to ISO DIS 9286, the method of measuring free silicon in silicon carbide fine powder. The silicon or silicon-carbon composite contains 1 to 90% by weight, preferably 20 to 90% by weight of zero-valent silicon, as computed from the quantity of hydrogen gas generated.

(iii) A particle has the structure that voids are observable when its interior is observed under a scanning electron microscope (SEM).

Figure 3:
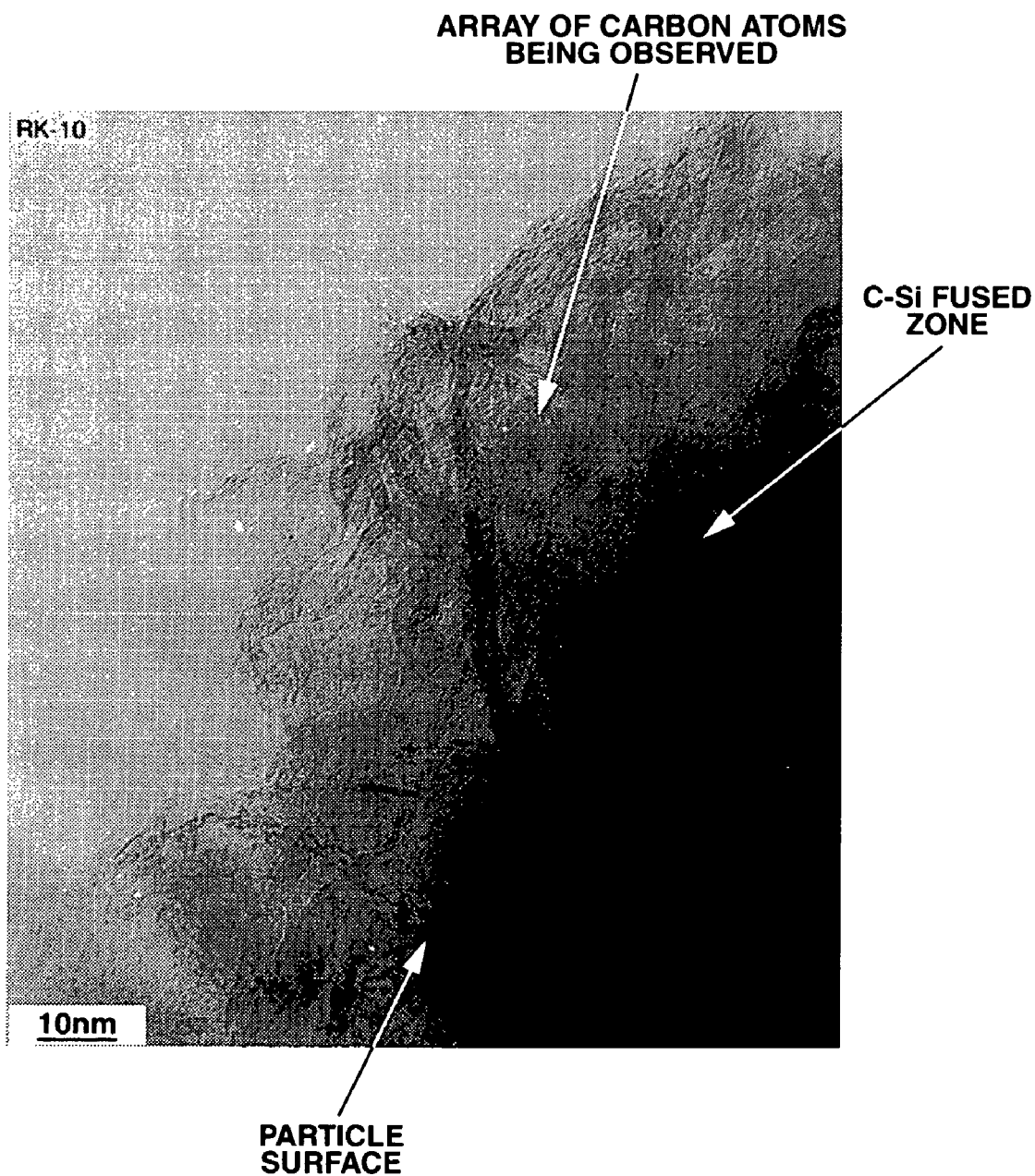
FIG. 3 is a photomicrograph under a transmission electron microscope, showing the fused state at the interface between a silicon base composite and a carbon layer.

By the term "coated with carbon" or "fused" as used herein, it is meant that carbon and silicon coexist between the carbon layer in laminar arrangement and the inner silicon composite, and carbon and silicon are melt-joined together at the interface. The fused state is observable under TEM (see FIG. 3).

The silicon fine particles used herein preferably have a purity of at least 95% (i.e., 95 to 100%), more preferably at least 99.0% (i.e., 99.0 to 100%). The silicon fine particles used herein may be those obtained by starting with a silicon oxide powder represented by the formula: SiOx wherein $1 \leq x < 1.6$, effecting chemical vapor deposition of an organic matter gas and/or vapor at a temperature of 500 to 1,200° C., preferably 500 to 1,000° C., more preferably 500 to 900° C., and then effecting heat treatment in an inert gas atmosphere at a temperature of 1,000 to 1,400° C., preferably 1,100 to 1,300° C., for disproportionation into silicon and silicon dioxide. Alternatively, silicon fine particles are obtained by co-sintering silicon oxide and an organosilicon compound and effecting disproportionation during the sintering step.

Primary fine particles of silicon, silicon alloy or silicon oxide should preferably have an average particle size of 100 nm to 10 μm, more preferably 100 nm to 7 μm, and most preferably 1 to 5 μm. Desirably the particle size is uniform. It is noted that throughout the specification, the average particle size is determined as a weight average diameter $D_{50}$ (particle diameter at 50% by weight cumulative, or median diameter) upon measurement of particle size distribution by laser light diffractometry.

In the case of silicon-carbon composite particles, primary fine particles of carbon should preferably have an average particle size of 100 nm to 20 μm, more preferably 1 to 20 μm, and most preferably 3 to 10 μm. Also desirably the particle size is uniform. Natural or synthetic graphite in globular or flaky form is preferred as the carbon fine particles, because of ease of formation of electrode film and the ability to occlude and release lithium ions. The silicon oxide particles and the carbon fine particles are combined so that the weight ratio of the silicon particles obtained from the silicon oxide particles used and the carbon fine particles becomes within the above range.

In the case of silicon-carbon composite particles, the silicon or silicon alloy fine particles and the carbon fine particles are preferably combined in a weight ratio between 90:10 and 20:80, more preferably between 80:20 and 40:60. Too small an amount of carbon may lead to inferior cycle performance whereas too much carbon may lead to a drop of charge/discharge capacity per unit volume (or energy density).

The silicon-base inorganic compound serving as a binder is typically an Si—C—O composite, Si—C—N composite, $SiN_x$, $SiO_y$, $SiC_z$ or a mixture thereof, which is formed by the sintering of an organosilicon compound or a mixture thereof. Herein, x, y and z are positive numbers in the range: $0 < x \leq 4/3$, preferably $0.1 \leq x \leq 4/3$, $0 < y \leq 2$, preferably $0.1 \leq y \leq 2$, and $0 < z \leq 1$, preferably $0.1 \leq z \leq 1$.

Specifically, the Si—C—O composite is obtainable by coating fine particles of silicon, silicon alloy or silicon oxide with an organopolysiloxane capable of achieving a high degree of crosslinking (e.g., a curable organopolysiloxane composition of the addition cure or condensation cure type), establishing an inert atmosphere, and firing at a high temperature to become inorganic. The Si—C—N composite is obtainable by a similar procedure, such as using a nitrogen-containing organopolysiloxane capable of achieving a high degree of crosslinking (e.g., an amino-modified organopolysiloxane composition of the addition cure or condensation cure type) and/or organopolysilazane instead of the above organopolysiloxane, and firing for inorganic conversion. $SiN_x$ is obtainable by coating fine particles with polycarbosilane, and firing in an ammonia atmosphere for inorganic conversion. $SiO_y$ is obtainable by coating fine particles with tetraalkoxysilane or the like, curing and similarly firing for inorganic conversion. $SiC_z$ is obtainable by coating fine particles with tetraalkyl silane or the like, curing and similarly firing for inorganic conversion. It is understood that the Si—C—O composite or Si—C—N composite refers to a sintered inorganic mass containing silicon, carbon and oxygen or silicon, carbon and nitrogen as constituent atoms.

The organosilicon compound or mixture thereof from which the silicon-base inorganic compound binder is formed is typically a reactive silane or siloxane having a crosslinkable group or a curable polysiloxane composition.

The organosilicon compound may be any of compounds which have per molecule at least two crosslinkable functional groups attached to silicon atoms, such as aliphatic unsaturated groups (e.g., alkenyl groups), hydroxyl groups, hydrogen atoms or hydrolyzable groups, or a combination of two or more such compounds. The organosilicon compound may be straight, branched or cyclic. Exemplary organosilicon compounds include linear organopolysiloxanes having the general formulae (1) and (2), branched organopolysiloxanes having the general formula (3), cyclic organopolysiloxanes having the general formula (4), and silanes and silicone resins having the general formula (5), all shown below.

The preferred organosilicon compounds are liquid although silicone resins and other compounds which are solid are acceptable as long as they have a softening point. On use, the organosilicon compounds may be diluted with organic solvents in which they are dissolvable or non-reactive silicone oils. Exemplary organic solvents include hexane, toluene and xylene. Dimethylpolysiloxane oil is a typical non-reactive silicone oil.

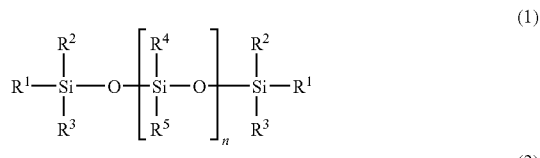

(1)

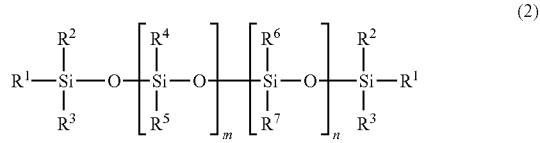

(2)

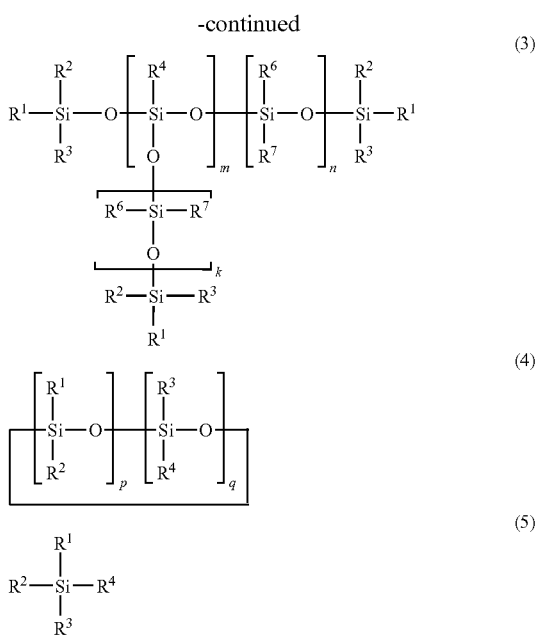

Herein, $R^1$ to $R^7$ are each independently a hydrogen atom, hydroxyl group, hydrolyzable group or monovalent hydrocarbon group. In each of the compounds of formulae (1) to (5), at least two substituent groups attached to silicon atoms are hydrogen atoms, hydroxyl groups, hydrolyzable groups or aliphatic unsaturated groups (e.g., alkenyl groups). The subscripts m, n and k are numbers in the range of 0 to 2,000, p and q are numbers in the range of 0 to 10, excluding that p and q are equal to 0 at the same time.

Suitable hydrolyzable groups include alkoxy, alkenyloxy and acyloxy groups having 1 to 6 carbon atoms. Suitable monovalent hydrocarbon groups include those of 1 to 12 carbon atoms, preferably 1 to 8 carbon atoms, for example, alkyl, alkenyl, alkynyl, aryl and aralkyl groups. Specific examples are alkyl groups such as methyl, ethyl, propyl, butyl and hexyl, alkenyl groups such as vinyl, allyl, butenyl, hexenyl and cyclohexenyl, aryl groups such as phenyl and tolyl, and aralkyl groups such as benzyl and phenylethyl.

In formulae (1) to (5), m, n and k are numbers in the range of 0 to 2,000, preferably 0 to 1,000, p and q are numbers in the range of 0 to 10, p and q are not equal to 0 at the same time, and preferably the sum of p+q is from 3 to 10.

The crosslinkable silanes and siloxanes used as the starting reactant are not particularly limited as long as they are used in conventional silicone manufacture processes. In general, a chain-like polymer of organosilicon-based high-molecular-weight compound molecules such as an organosiloxane polymer has the tendency that when heated in a non-oxidizing gas stream, its backbone bonds readily undergo thermal cleavage decomposing into low-molecular-weight segments (e.g., cyclic oligomers of 3 to 6 monomer units) which are volatile. In contrast, since silicon-carbon bonds formed by hydrosilylation reaction are resistant to heat, a polymer which has been crosslinked through such a mechanism is less susceptible to decomposition into lower molecular weights, and even when cleavage occurs, the resulting substances are less volatile due to a high degree of crosslinking. Then the silanes or siloxanes can be converted into inorganic form without volatilizing off even during the firing step. Preferred is an addition reaction-curable organopolysiloxane composition comprising a silane and/or siloxane having at least two, especially at least three SiH groups in a molecule and a silane and/or siloxane having at least two aliphatic unsaturated groups (e.g., alkenyl, alkynyl groups) in a molecule, selected from among compounds of formulae (1) to (5), wherein hydrosilylation reaction takes place in the presence of a known hydrosilylation catalyst such as platinum or platinum compounds to form a crosslinked product.

It is also preferred to use a silicone resin which has hydrolyzable groups such as hydroxyl, alkoxy or acyloxy groups in a molecule and can condense through catalytic reaction or non-catalytic reaction to a high degree of crosslinking.

The reactive organosilicon compound or mixture thereof used as the starting reactant is preferably a silane or siloxane represented by the average formula:

$$C_hH_iSiO_jN_k$$

wherein h, i and j are positive numbers, k is 0 or a positive number, and (h-j) is more than 0, and having at least one crosslinkable site per 4 silicon atoms. The nitrogen atom may bond to the silicon atom directly or indirectly via a carbon atom.

In case of k=0, that is, the average formula: $C_hH_iSiO_j$, the reaction to form silicon carbide takes place according to the following scheme. In theory, h-j=1 is preferred although complete conversion to silicon carbide is not necessary.

$$C_hH_iSiO_j \rightarrow SiC + jCO + (i/2)H_2$$

However, some losses are estimated in the hydrosilylation reaction. It is then desired to use a silane, siloxane or mixture thereof wherein (h-j) is more than 0, preferably a silane, siloxane or mixture thereof wherein (h-j) is in a range of 0.9 to 1.5, more preferably 1.0 to 1.2. If (h-j) is 0 or negative, then the starting reactant contains a more proportion of oxygen, which may lead to a reduced yield and deteriorated characteristics like electric conductivity. Inversely, if (h-j) is more than 1.5, the C/Si/O composite material formed contains a more proportion of carbon, which may lead to a reduced yield. Then the preferred values of (h-j) are in the range: 0<h-j≦1.5.

Preferably, the silicon composite particles of the invention have a silicon or silicon alloy content of 1 to 90% by weight, more preferably 20 to 90% by weight, especially 20 to 80% by weight. Too low a silicon or silicon alloy content may lead to a lower charge/discharge capacity per unit volume (or energy density) whereas too high a content may make difficult the mitigation of volume changes upon charge/discharge cycles. The balance is the silicon-base inorganic compound binder.

Also preferably, the silicon-carbon composite particles of the invention have a silicon or silicon alloy content of 1 to 90% by weight, more preferably 20 to 90% by weight, especially 40 to 80% by weight. Too low a silicon or silicon alloy content may lead to a lower charge/discharge capacity per unit volume (or energy density) whereas too high a content may deteriorate the cycle performance. The carbon content is preferably 1 to 80% by weight, more preferably 10 to 80% by weight, especially 20 to 60% by weight. The content of the silicon-base inorganic compound binder is the balance, and is usually 1 to 98% by weight, preferably 10 to 80% by weight.

Each silicon or silicon-carbon composite particle (containing voids within itself) has a void content of 1 to 70% by volume, especially 5 to 50% by volume. Too low a void content may make difficult the mitigation of volume changes upon charge/discharge cycles and deteriorate the cycle performance whereas too high a void content may lead to a lower charge/discharge capacity per unit volume (or energy density).

The silicon or silicon-carbon composite particles preferably have an average particle size of 0.5 to 30 µm, more preferably 1 to 30 µm, most preferably 5 to 20 µm, in view of formation of a negative electrode film and cycle performance when the particles are used as negative electrode material for lithium ion secondary cells.

In a preferred embodiment, the silicon or silicon-carbon composite particles are surface coated with carbon. The amount of carbon coated or deposited on the silicon or silicon-carbon composite particles is preferably 1 to 50% by weight, more preferably 5 to 40% by weight, most preferably 5 to 30% by weight based on the silicon or silicon-carbon composite particles. When the silicon or silicon-carbon composite particles with a carbon coating amount of less than 1% by weight are used alone as the negative electrode active material, the negative electrode film may be short of conductivity and a lithium ion secondary cell having the electrode assembled therein will develop unsatisfactory cell characteristics such as cycle performance. A carbon coating amount of more than 50% by weight indicates a too high carbon proportion which may reduce the negative electrode capacity, with less benefits derived.

When used alone as the negative electrode active material, the silicon or silicon-carbon composite particles should desirably have an electric conductivity of at least $1\times10^{-6}$ S/m, more desirably at least $1\times10^{-4}$ S/m. With an electrical conductivity of less than $1\times10^{-6}$ S/m, the electrode is less conductive and may provide degraded cycle performance when used as the negative electrode in a lithium ion secondary cell. As used herein, the "electrical conductivity" is determined by filling a four-terminal cylindrical cell with a powder to be tested, conducting current flow through the powder, and measuring the voltage drop thereacross.

Now, it is described how to prepare the silicon or silicon-carbon composite particles of the invention.

Any desired method may be used in preparing the silicon or silicon-carbon composite particles of the invention as long as sintered particles have the structure that silicon or silicon alloy fine particles and optionally carbon fine particles are dispersed in a silicon base compound and voids are present in the interior and preferably have an average particle size of about 1 to 30 µm. For example, methods I and II described below are preferably employed.

Method I

Figure 4A:
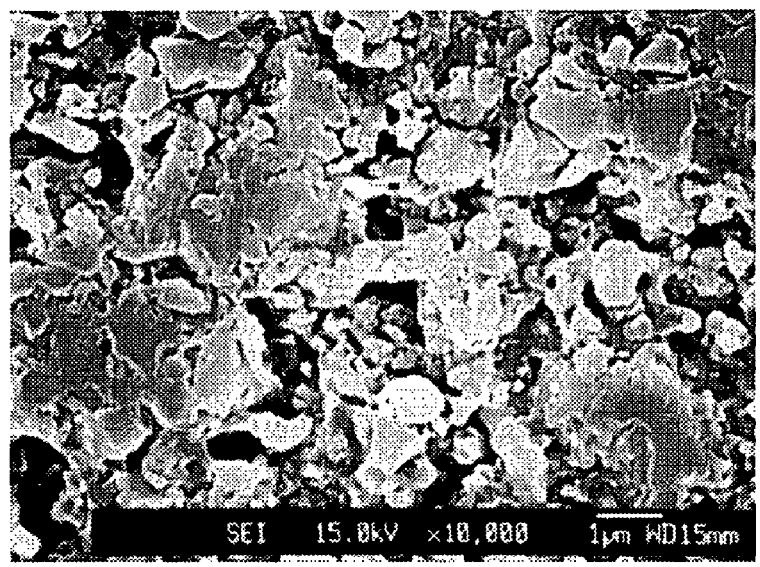
FIGS. 4A and B are SEM photomicrographs in section of a sintered silicon composite.
Figure 4B:
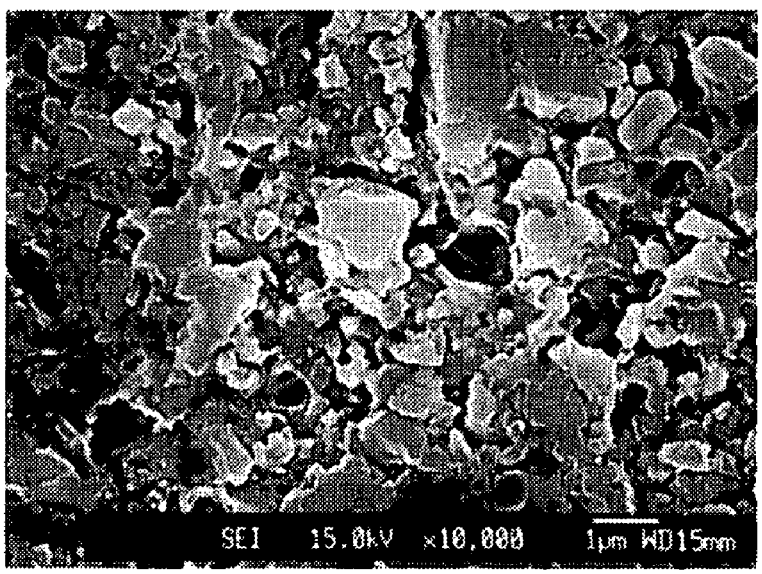
Figure 5A:
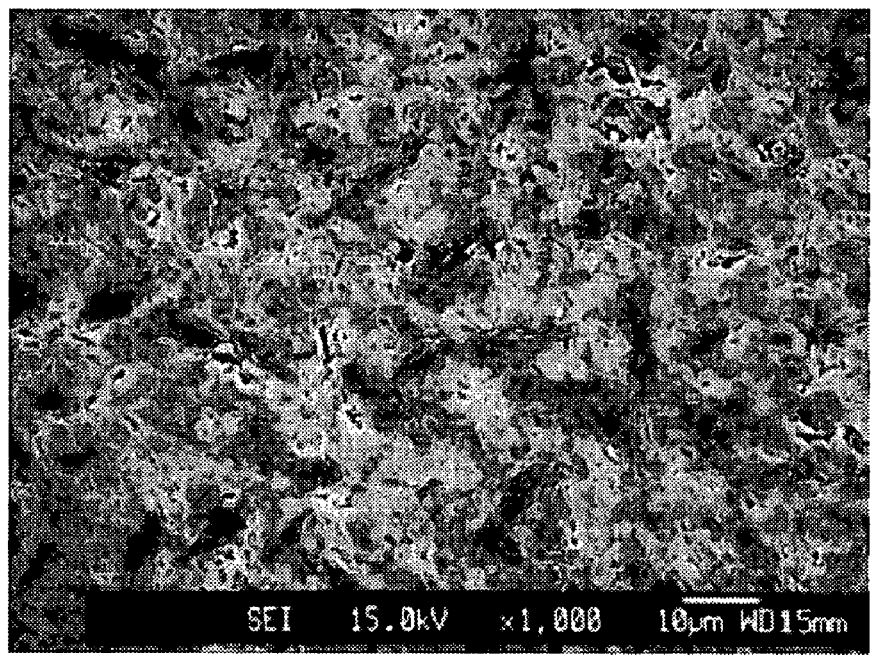
FIGS. 5A and 5B are SEM photomicrographs in section of a silicon-carbon composite having globular graphite (10 μm) incorporated.
Figure 5B:
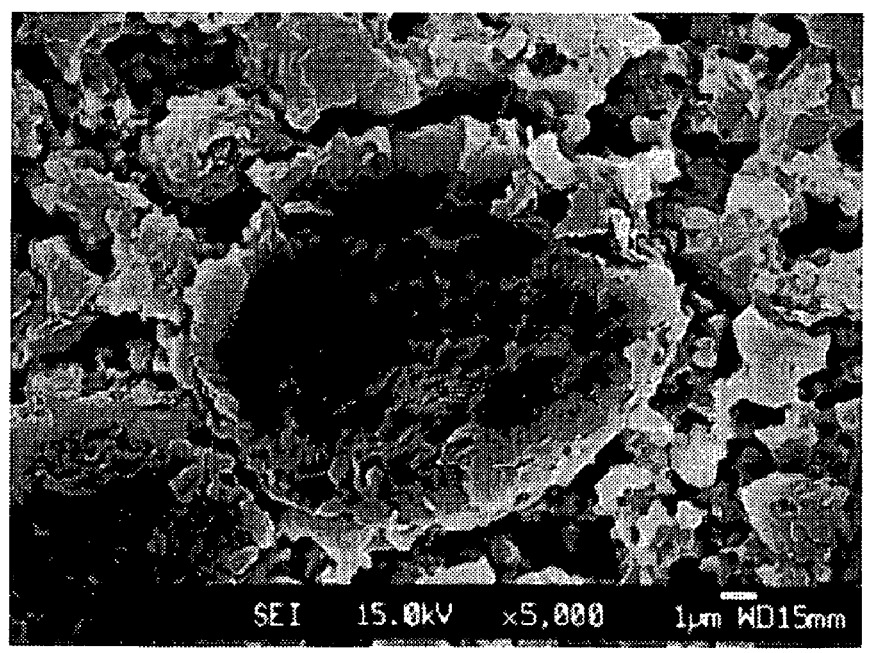
Figure 6A:
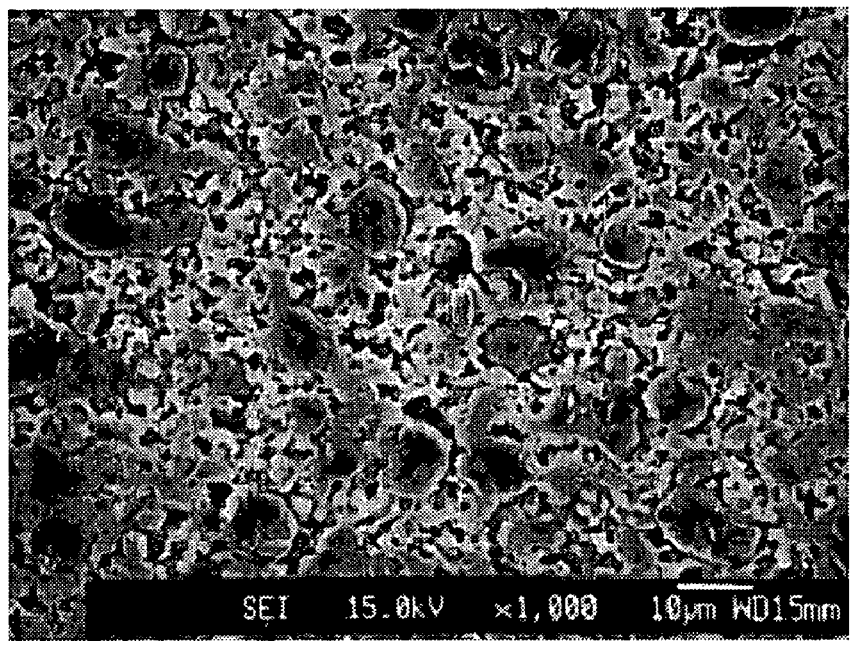
FIGS. 6A and 6B are SEM photomicrographs in section of a silicon-carbon composite having flaky graphite (6 μm) incorporated.
Figure 6B:
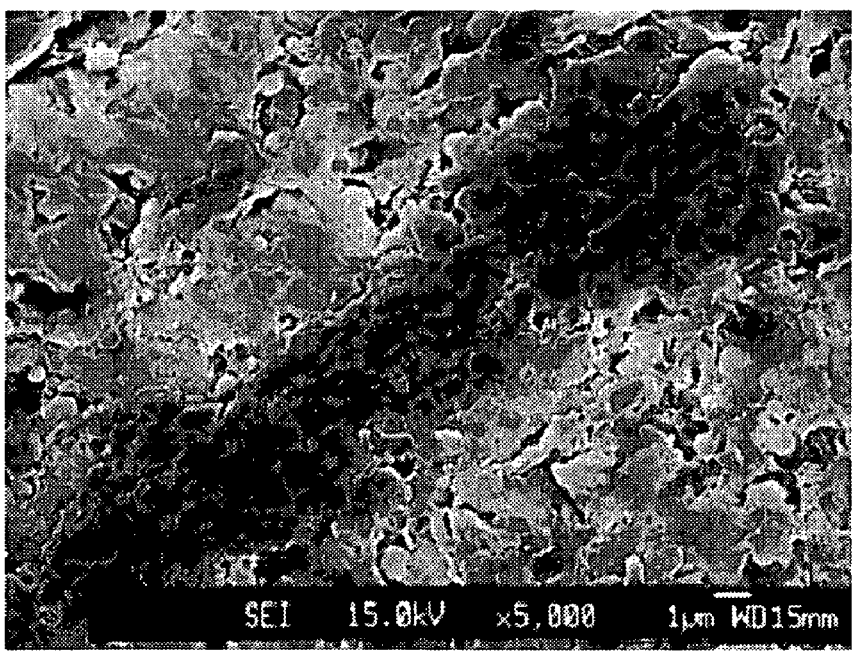
Figure 7A:
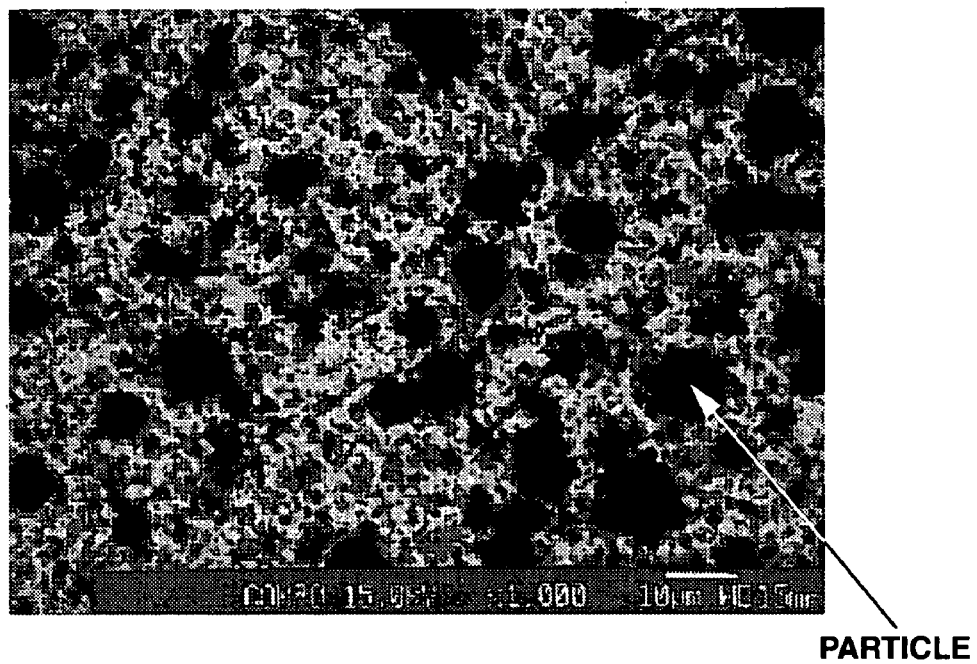
FIGS. 7A and 7B are REM photomicrographs (composition images) in section of silicon-carbon composites having globular graphite and flaky graphite incorporated, respectively.
Figure 7B:
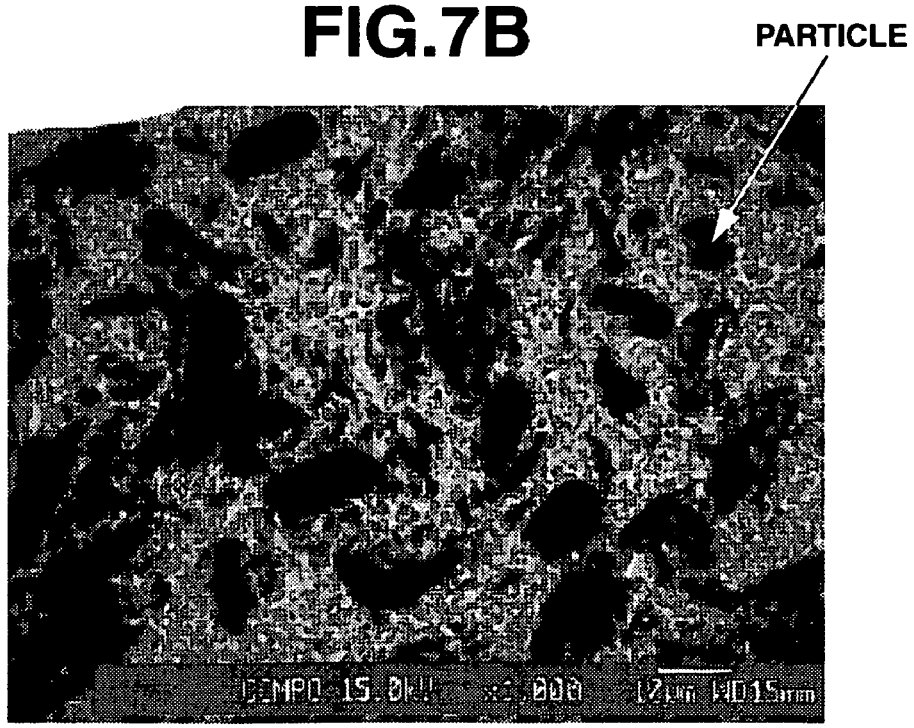

To a silicon, silicon alloy or silicon oxide powder obtained by finely dividing a silicon or silicon alloy mass by mechanical grinding and preferably sized to a fraction of 100 nm to 10 µm, more preferably 100 nm to 7 µm, most preferably 1 to 5 µm or a mixture thereof with a globular or flaky carbon powder preferably sized to a fraction of 100 nm to 20 µm, more preferably 1 to 20 µm, most preferably 3 to 10 µm, is added an organosilicon compound or a mixture thereof, especially an addition reaction-curable organopolysiloxane composition comprising a vinylsiloxane, hydrogensiloxane and a platinum catalyst. The resulting mixture is thoroughly admixed and pre-cured at a temperature below 300° C. The lower limit of the pre-cure temperature is not limited, although it may be at least 40° C. An organic solvent is added if necessary to achieve intimate mixing. This is followed by heat treatment in an inert atmosphere at a temperature in the range of 500 to 1,400° C., preferably 600 to 1,400° C., more preferably 750 to 1,300° C., most preferably 900 to 1,200° C. There are obtained agglomerates of silicon composite or silicon-carbon composite having voids in the interior and bound with the Si—C—O composite, Si—C—N composite, $SiN_x$, $SiO_y$, $SiC_z$ or similar binder. A model image of the interior is illustrated in FIG. 2. Images of actual SEM observation are shown in FIGS. 4 to 6. Images of REM observations (i.e., BEI: Backscattered Electron Image in which backscattered electrons detected by Backscattered Electron Detector is converted to COMPO Image) are shown in FIG. 7. FIG. 4 is a photomicrograph of the silicon composite, and FIGS. 5 to 7 are photomicrographs of the silicon-carbon composite. The agglomerates are then comminuted and classified to collect a fraction of silicon or silicon-carbon composite particles having a desired particle size. Any desired comminuting technique may be used. No particular limit is imposed on the pre-curing atmosphere. The inert gas atmosphere may be a non-oxidizing atmosphere such as nitrogen, argon or the like.

In order to improve the adhesion between the silicon or silicon alloy fine particles and the organosilicon compound or mixture thereof, surfaces of the silicon or silicon alloy fine particles are advantageously pretreated with one or more organosilicon surface treating agents selected from among silane coupling agents or (partial) hydrolytic condensates thereof, silylating agents such as organopolysilazane, and silicone resins, represented by the formulae (6), (7) and (8), respectively.

   (6)

   (7)

   (8)

Herein, R is a monovalent organic group, Y is a monovalent hydrolyzable group or hydroxyl group, Z is a divalent hydrolyzable group, "a" is an integer of 1 to 4, and "b" is a positive number of 0.8 to 3, preferably 1 to 3. R' is a hydrogen atom or a substituted or unsubstituted monovalent hydrocarbon group of 1 to 10 carbon atoms, R" is a hydrogen atom or a substituted or unsubstituted monovalent hydrocarbon group of 1 to 6 carbon atoms, e and f are 0 or positive numbers satisfying $0 \leq e \leq 2.5$, $0.01 \leq f \leq 3$, and $0.5 \leq e+f \leq 3$.

Suitable monovalent organic groups represented by R include unsubstituted monovalent hydrocarbon groups of 1 to 12 carbon atoms, especially 1 to 10 carbon atoms, such as alkyl, cycloalkyl, alkenyl, aryl and aralkyl; substituted monovalent hydrocarbon groups in which some or all of the hydrogen atoms are replaced by halogen atoms (e.g., chloro, fluoro, bromo), cyano groups, oxyalkylene groups (e.g., oxyethylene), polyoxyalkylene groups (e.g., polyoxyethylene), or functional groups such as (meth)acryl, (meth)acryloxy, acryloyl, methacryloyl, mercapto, amino, amido, ureido, and epoxy; and modified forms of the foregoing substituted or unsubstituted monovalent hydrocarbon groups which are separated by an oxygen atom, NH group, $NCH_3$ group, $NC_6H_5$ group, $C_6H_5NH$— group, $H_2NCH_2CH_2NH$— group or the like.

Examples of R include alkyl groups such as $CH_3$—, $CH_3CH_2$—, $CH_3CH_2CH_2$—; alkenyl groups such as $CH_2$=CH—, $CH_2$=CHCH$_2$—, $CH_2$=C(CH$_3$)—; aryl groups such as $C_6H_5$—; $ClCH_2$—, $ClCH_2CH_2CH_2$—, $CF_3CH_2CH_2$—, $(CN)CH_2CH_2$—, $CH_3$—$(CH_2CH_2O)_3$—$CH_2CH_2CH_2$—, $CH_2(O)CHCH_2OCH_2CH_2CH_2$— (wherein $CH_2(O)CHCH_2$ is glycidyl), $CH_2$=CHCOOCH$_2$—,

-continued

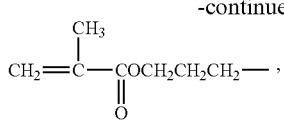

—HSCH$_2$CH$_2$CH$_2$—, NH$_2$CH$_2$CH$_2$CH$_2$—, NH$_2$CH$_2$CH$_2$NHCH$_2$CH$_2$CH$_2$—, NH$_2$CONHCH$_2$CH$_2$CH$_2$—, etc. Preferred groups of R are γ-glycidyloxypropyl, β-(3,4-epoxycyclohexyl)ethyl, γ-aminopropyl, γ-cyanopropyl, γ-acryloxypropyl, γ-methacryloxypropyl, and γ-ureidopropyl.

Suitable monovalent hydrolyzable groups represented by Y include alkoxy groups such as —OCH$_3$ and —OCH$_2$CH$_3$; amino groups such as —NH$_2$, —NH—, —N=, —N(CH$_3$)$_2$; —Cl, oximino groups such as —ON=C(CH$_3$)CH$_2$CH$_3$, aminoxy groups such as —ON(CH$_3$)$_2$, carboxyl groups such as —OCOCH$_3$, alkenyloxy groups such as —OC(CH$_3$)=CH$_2$, and —CH(CH$_3$)—COOCH$_3$ and —C(CH$_3$)$_2$—COOCH$_3$. All Y groups may be the same or different. Preferred groups of Y are alkoxy groups such as methoxy and ethoxy, and alkenyloxy groups such as isopropenyloxy.

Suitable divalent hydrolyzable groups represented by Z include imide residues (—NH—), substituted or unsubstituted acetamide residues, urea residues, carbamate residues and sulfamate residues.

The subscript a is an integer of 1 to 4, preferably 3 or 4; b is a positive number of 0.8 to 3, preferably 1 to 3.

Examples of the silane coupling agent include alkoxysilanes, such as tetraalkoxysilanes, ogranotrialkoxysilanes and diorganodialkoxysilanes, typically methyltrimethoxysilane, tetraethoxysilane, vinyltrimethoxysilane, methylvinyldimethoxysilane, γ-aminopropyltriethoxysilane, γ-mercaptopropyltrimethoxysilane, γ-cyanopropyltrimethoxysilane, N-β-(aminoethyl)-γ-amiopropyltrimethoxysilane, γ-methacryloxypropyltrimethoxysilane, γ-glycidyloxypropyltrimethoxysilane, β-(3,4-epoxycyclohexyl)ethyltrimethoxysilane, and γ-ureidopropyltrimethoxysilane. These silane coupling agents may be used alone or in admixture. Hydrolytic condensates and/or partial hydrolytic condensates of the foregoing compounds are also useful.

Examples of silylating agents having formula (7) include organo(poly)silazanes such as hexamethyldisilazane, divinyltetramethyldisilazane, tetravinyldimethyldisilazane, octamethyltrisilazane; N,O-bis(trimethylsilyl)acetamide, N,O-bis(trimethylsilyl)carbamate, N,O-bis(trimethylsilyl)sulfamate, N,O-bis(trimethylsilyl)trifluoroacetamide, and N,N'-bis(trimethylsilyl)urea, with divinyltetramethyldisilazane being most preferred.

In formula (8), R' and R" are preferably alkyl, cycloalkyl, alkenyl and aryl groups, and examples of R' and R" include the same groups exemplified in R so long as the groups have the carbon numbers defined in R' and R".

Examples of silicone resins having formula (8) include organosiloxane oligomers of about 2 to about 50 silicon atoms, preferably about 2 to about 30 silicon atoms, having at least one, preferably at least two alkoxy residues in a molecule, resulting from partial hydrolytic condensation of alkoxysilanes having 2 to 4 alkoxy groups in a molecule, for example, tetraalkoxysilanes, organotrialkoxysilanes and diorganodialkoxysilanes, typically tetraethoxysilane, vinyltrimethoxysilane and methylvinyldimethoxysilane, as exemplified above for the silane coupling agent.

An appropriate amount of the surface treating agent used is typically 0.1 to 50% by weight, preferably 0.5 to 30% by weight, more preferably 1 to 5% by weight, based on the weight of silicon or silicon alloy fine particles.

Method II

The silicon or silicon-carbon composite particles obtained by Method I, preferably after comminution to a particle size of about 0.1 to 50 μm, is further heat treated in a non-oxidizing atmosphere containing at least organic matter gas and/or vapor and at a temperature of 800 to 1,400° C., preferably 900 to 1,300° C., more preferably 1,000 to 1,200° C. for effecting chemical vapor deposition on surfaces.

In connection with Method I wherein silicon, silicon alloy or silicon oxide powder is admixed with an addition reaction-curable organopolysiloxane composition comprising a reactive vinylsiloxane, hydrogensiloxane and a hydrosilylation catalyst (e.g., platinum catalyst), if the admixture is directly heated to a high firing temperature without pre-curing at a temperature below 300° C., cracking of siloxane into low-molecular-weight siloxane preferentially occurs, leading to an increased loss. Also, if the firing temperature in an inert atmosphere is below 600° C., especially below 500° C., inorganic conversion becomes insufficient to ensure cell characteristics. If the firing temperature is higher than 1,400° C., fusion and agglomeration of silicon take place and in case of silicon oxide, disproportionation thereof proceeds to such an extent to degrade the cycle performance.

In connection with Method II, if the heat treating temperature is below 800° C., carbonization or inorganic conversion becomes insufficient, inviting drops of initial efficiency and cycle performance. If the temperature is too high, problems arise in a lithium ion secondary cell with respect to its characteristics.

In this way, a carbon coating is formed preferably by effecting thermal CVD (chemical vapor deposition treatment at or above 800° C.). The time of thermal CVD is determined as appropriate relative to the amount of carbon coated. During the treatment, particles sometimes agglomerate together, and if so, the agglomerates are subsequently disintegrated on a ball mill or the like. In some cases, thermal CVD is repeated similarly.

In the practice of the invention, the organic material to generate the organic gas is selected from those materials capable of producing carbon (graphite) through pyrolysis at the heat treatment temperature, especially in a non-oxidizing atmosphere. Exemplary are hydrocarbons such as methane, ethane, ethylene, acetylene, propane, butane, butene, pentane, isobutane, and hexane alone or in admixture of any, and monocyclic to tricyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, and phenanthrene alone or in admixture of any. Also, gas light oil, creosote oil and anthracene oil obtained from the tar distillation step are useful as well as naphtha cracked tar oil, alone or in admixture.

For the thermal CVD (thermal chemical vapor deposition), any desired reactor having a heating mechanism may be used in a non-oxidizing atmosphere. Depending on a particular purpose, a reactor capable of either continuous or batchwise treatment may be selected from, for example, a fluidized bed reactor, rotary furnace, vertical moving bed reactor, tunnel furnace, batch furnace and rotary kiln. The treating gas used herein may be the aforementioned organic gas alone or in admixture with a non-oxidizing gas such as Ar, He, H$_2$ or N$_2$.

According to the invention, the silicon or silicon-carbon composite particles may be used as a negative electrode material, specifically a negative electrode active material to construct a non-aqueous electrolyte secondary cell, especially a lithium ion secondary cell, having a high capacity and improved cycle performance.

The lithium ion secondary cell thus constructed is characterized by the use of the silicon or silicon-carbon composite particles as the negative electrode active material while the materials of the positive electrode, electrolyte, and separator and the cell design are not critical. For example, the positive electrode active material used herein may be selected from transition metal oxides such as $LiCoO_2$, $LiNiO_2$, $LiMn_2O_4$, $V_2O_5$, $MnO_2$, $TiS_2$ and $MoS_2$ and chalcogen compounds. The electrolytes used herein may be lithium salts such as lithium perchlorate in non-aqueous solution form. Examples of the non-aqueous solvent include propylene carbonate, ethylene carbonate, dimethoxyethane, γ-butyrolactone and 2-methyltetrahydrofuran, alone or in admixture. Use may also be made of other various non-aqueous electrolytes and solid electrolytes.

When a negative electrode is prepared using the inventive silicon or silicon-carbon composite particles, a conductive agent such as graphite may be added to the particles. The type of conductive agent used herein is not critical as long as it is an electronically conductive material which does not undergo decomposition or alteration in the cell. Illustrative conductive agents include metals in powder or fiber form such as Al, Ti, Fe, Ni, Cu, Zn, Ag, Sn and Si, natural graphite, synthetic graphite, various coke powders, meso-phase carbon, vapor phase grown carbon fibers, pitch base carbon fibers, PAN base carbon fibers, and graphite obtained by firing various resins.

On use of the silicon composite particles, the conductive agent is not always necessary if the particles have been coated with carbon by thermal CVD. If the particles have not been coated with carbon, the amount of conductive agent is preferably 20 to 70% by weight, more preferably 30 to 60% by weight, even more preferably 30 to 50% by weight of the mixture of silicon composite particles plus conductive agent. A mixture with less than 20% of the conductive agent may fail to withstand expansion and contraction on charge/discharge cycles, whereas a mixture with more than 70% of the conductive agent may have a reduced charge/discharge capacity.

On use of the silicon-carbon composite particles, the conductive agent is not always necessary if the particles have been coated with carbon by thermal CVD. If the particles have not been coated with carbon, the amount of conductive agent is preferably 10 to 70% by weight, more preferably 20 to 50% by weight, even more preferably 20 to 40% by weight of the mixture of silicon-carbon composite particles plus conductive agent. A mixture with less than 10% of the conductive agent may fail to withstand expansion and contraction on charge/discharge cycles, whereas a mixture with more than 70% of the conductive agent may have a reduced charge/discharge capacity.

EXAMPLE

Examples of the invention are given below by way of illustration and not by way of limitation. In Examples, all parts and percents are by weight unless otherwise stated.

Example 1

Metallic silicon of chemical grade (low Al silicon available from SIMCOA Operations Pty. Ltd., Australia, Al 0.05%, Fe 0.21%, Ca 0.003%) was crushed on a jaw crusher, and milled on a ball mill and then a bead mill using hexane as a dispersing medium until fine particles having an average particle size of about 1 μm were obtained. By passing the resulting suspension through a filter, removing the solvent in a nitrogen atmosphere, and cutting off a fraction of coarse particles by a pneumatic precision classifier (Nisshin Engineering Co., Ltd.), a powder having an average particle size of about 0.8 μm was obtained. To 100 g of the silicon fine particles were added a curable siloxane composition comprising 12 grams (g) of tetramethyltetravinylcyclotetrasiloxane (LS-8670, Shin-Etsu Chemical Co., Ltd.), 8 g of methylhydrogensiloxane (KF-99, Shin-Etsu Chemical Co., Ltd.) and 0.1 g of a platinum catalyst (1% chloroplatinic acid solution), and 30 ml of hexane. The mixture was fully mixed in patty form. The mixture was then dried and pre-cured at 60° C.

The mixture in mass form was placed in an alumina container, which was closed with a lid, and fired in an atmosphere-controllable, temperature-programmable muffle furnace in a nitrogen atmosphere according to a temperature profile of 300° C. for 2 hours and then 1,000° C. for 3 hours. After cooling, the fired product was comminuted on a grinder (Masscolloider) with a set clearance of 20 μm, yielding silicon composite particles having an average particle size of about 10 μm (content of zero-valent silicon fine particles: 86% by weight, void content: 30% by volume as determined from a specific gravity measurement).

[Cell Test]

The evaluation of silicon composite particles as the negative electrode active material for a lithium ion secondary cell was carried out by the following procedure which was common to all Examples and Comparative Examples. (The same test is applicable to silicon composite particles and silicon-carbon composite particles.) A negative electrode material mixture was obtained by adding 42 parts of synthetic graphite (average particle diameter $D_{50}$=5 μm) to 48 parts of the silicon composite. To the mixture, 10 parts of polyvinylidene fluoride was added. N-methylpyrrolidone was then added thereto to form a slurry. The slurry was coated onto a copper foil of 20 μm gage and dried at 120° C. for one hour. Using a roller press, the coated foil was shaped under pressure into an electrode sheet, of which 2 $cm^2$ discs were punched out as the negative electrode.

To evaluate the charge/discharge performance of the negative electrode, a test lithium ion secondary cell was constructed using a lithium foil as the counter electrode. The electrolyte solution used was a non-aqueous electrolyte solution of lithium phosphorus hexafluoride in a 1/1 (by volume) mixture of ethylene carbonate and 1,2-dimethoxyethane (further containing 2 wt % of vinylene carbonate) in a concentration of 1 mol/liter. The separator used was a microporous polyethylene film of 30 μm thick.

The lithium ion secondary cell thus constructed was allowed to stand overnight at room temperature. Using a secondary cell charge/discharge tester (Nagano K.K.), a charge/discharge test was carried out on the cell. Charging was conducted with a constant current flow of 3 mA until the voltage of the test cell reached 0 V, and after reaching 0 V, continued with a reduced current flow so that the cell voltage was kept at 0 V, and terminated when the current flow decreased below 100 μA. Discharging was conducted with a constant current flow of 3 mA and terminated when the cell voltage rose above 2.0 V, from which a discharge capacity was determined.

The initial efficiency of this lithium ion secondary cell was determined. By repeating the above operations, the charge/discharge test on the lithium ion secondary cell was carried out 50 cycles. The test results are shown in Table 1. It is noted that the capacity is calculated based on the weight of negative electrode film.

Example 2

Metallic silicon of chemical grade (low Al silicon available from SIMCOA Operations Pty. Ltd., Australia, Al 0.05%, Fe 0.21%, Ca 0.003%) was crushed on a jaw crusher, and milled on a ball mill and then a bead mill using hexane as a dispersing medium until fine particles having an average particle size of about 1 µm were obtained. The resulting suspension was passed through a filter, and the content of hexane was measured in this state. Based on this result, an amount of the patty silicon-hexane mixture corresponding to 100 g of silicon fine particles was metered. To the patty silicon-hexane mixture was added a curable siloxane composition comprising 12 g of tetramethyltetravinylcyclotetrasiloxane (LS-8670, Shin-Etsu Chemical Co., Ltd.), 8 g of methylhydrogensiloxane (KF-99, Shin-Etsu Chemical Co., Ltd.) and 0.1 g of a platinum catalyst (1% chloroplatinic acid solution). The mixture was fully mixed in patty form. The mixture was then dried and pre-cured at 60° C. and cured at 200° C. for one hour in air.

The mixture in mass form was placed in an alumina container, which was closed with a lid, and fired in an atmosphere-controllable, temperature-programmable muffle furnace in a nitrogen atmosphere at 1,000° C. for 3 hours. After cooling, the fired product was comminuted on a grinder (Masscolloider) with a set clearance of 20 µm, yielding silicon composite particles having an average particle size of about 10 µm (content of zero-valent silicon fine particles: 88% by weight, void content: 25% by volume as determined from a specific gravity measurement).

It was evaluated as the negative electrode active material for a lithium ion secondary cell as in Example 1. The results are shown in Table 1.

Example 3

100 g of metallic silicon of chemical grade (grade HG available from ELKEM, Norway, Al 0.10%, Fe 0.04%) and 1 g of divinyltetramethyldisilazane were weighed and placed in a closed container. After thorough mixing, the mixture was heated at 100° C. for one hour for silylation. The thus surface treated silicon powder, 100 g, was weighed and subsequently processed as in Example 1. There were yielded silicon composite particles (content of zero-valent silicon fine particles: 89% by weight, void content: 32% by volume as determined from a specific gravity measurement).

It was evaluated as the negative electrode active material for a lithium ion secondary cell as in Example 1. The results are shown in Table 1.

Comparative Example 1

Metallic silicon of chemical grade (low Al silicon available from SIMCOA Operations Pty. Ltd., Australia, Al 0.05%, Fe 0.21%, Ca 0.003%) was crushed on a jaw crusher, and milled on a ball mill and then a bead mill using hexane as a dispersing medium until fine particles having an average particle size of about 1 µm were obtained. By passing the resulting suspension through a filter, removing the solvent in a nitrogen atmosphere, and cutting off a fraction of coarse particles by a pneumatic precision classifier (Nisshin Engineering Co., Ltd.), a powder having an average particle size of about 0.8 µm was obtained. The powder had a content of zero-valent silicon fine particles of 98% by weight, but each particle was substantially free of voids as demonstrated by a specific gravity of 2.2.

The silicon fine powder having a narrow particle size distribution with the fraction of coarse particles cut off was evaluated as the negative electrode active material for a lithium ion secondary cell as in Example 1. The results are shown in Table 1.

TABLE 1

|  | Example | | | Comparative Example |
|---|---|---|---|---|
|  | 1 | 2 | 3 | 1 |
| Starting material | Silicon | Silicon | Silicon | Silicon |
| Primary particles (µm)* | 0.8 | 1.0 | 1.0 | 0.8 |
| Secondary particles (µm)* | 10 | 10 | 11 | 1 |
| Initial charge capacity** (mAh/g) | 2100 | 2140 | 2185 | 2300 |
| Initial efficiency (%) | 90 | 91 | 90 | 89 |
| Retention at 50th cycle (%) | 83 | 85 | 84 | 4 |

*"Primary particles" means a mean particles size of the starting fine particles and "Secondary particles" means a mean particles size of the resulting composite particles, and so.
**The capacity is calculated based on the negative electrode film weight.

Example 4

In an inert gas (argon) atmosphere, a block or flake form of silicon oxide (SiOx, x=1.05) was heated at 1,300° C. for one hour for disproportionation into silicon and silicon dioxide. Analysis of the resulting powder by x-ray diffractometry (Cu—Kα) revealed a diffraction line attributable to Si(111) near $2\theta=28.4°$, from the half width of which a grain size of about 75 nm was determined by Scherrer method. The heat treated silicon-silicon dioxide composite was milled on a ball mill and then a bead mill using hexane as a dispersing medium. By passing the resulting suspension through a filter and removing the solvent in a nitrogen atmosphere, a powder having an average particle size of about 1 µm was obtained. To 100 g of the silicon-silicon dioxide composite powder were added a curable siloxane composition comprising 12 g of tetramethyltetravinylcyclotetrasiloxane (LS-8670, Shin-Etsu Chemical Co., Ltd.), 8 g of methylhydrogensiloxane (KF-99, Shin-Etsu Chemical Co., Ltd.) and 0.1 g of a platinum catalyst (1% chloroplatinic acid solution), and 30 ml of hexane. The mixture was fully mixed in patty form. The mixture was then dried and pre-cured at 60° C.

The mixture in mass form was placed in an alumina container, which was closed with a lid, and fired in an atmosphere-controllable, temperature-programmable muffle furnace in a nitrogen atmosphere according to a temperature profile of 300° C. for 2 hours and then 1,000° C. for 3 hours. After cooling, the fired product was comminuted on a grinder (Masscolloider) with a set clearance of 20 µm, yielding a silicon composite powder having an average particle size of about 10 µm (content of zero-valent silicon fine particles: 28% by weight, void content: 28% by volume as determined from a specific gravity measurement).

The silicon composite fine powder was evaluated as the negative electrode active material for a lithium ion secondary cell as in Example 1. The results are shown in Table 2.

Example 5

A block or flake form of silicon oxide (SiOx, x=1.05) was milled on a ball mill and then a bead mill using hexane as a dispersing medium. By passing the resulting suspension through a filter and removing the solvent in a nitrogen atmosphere, a powder having an average particle size of about 1 µm was obtained. To 100 g of the silicon oxide powder were added a curable siloxane composition comprising 12 g of tetramethyltetravinylcyclotetrasiloxane (LS-8670, Shin-Etsu Chemical Co., Ltd.), 8 g of methylhydrogensiloxane (KF-99, Shin-Etsu Chemical Co., Ltd.) and 0.1 g of a platinum catalyst (1% chloroplatinic acid solution), and 30 ml of hexane. The mixture was fully mixed in patty form. The mixture was then dried and pre-cured at 60° C.

The mixture in mass form was placed in an alumina container, which was closed with a lid, and heated in an atmosphere-controllable, temperature-programmable muffle furnace in a nitrogen atmosphere according to a temperature profile of 300° C. for 2 hours and then 1,200° C. for 3 hours, effecting firing and disproportionation within the silicon oxide structure. After cooling, the fired product was comminuted on a grinder (Masscolloider) with a set clearance of 20 μm, yielding a silicon composite powder having an average particle size of about 10 μm (content of zero-valent silicon fine particles: 27% by weight, void content: 30% by volume as determined from a specific gravity measurement). Analysis of the resulting powder by x-ray diffractometry (Cu—Kα) revealed a diffraction line attributable to Si(111) near 2θ=28.4°, from the half width of which a grain size of about 65 nm was determined by Scherrer method.

The silicon composite fine powder was evaluated as the negative electrode active material for a lithium ion secondary cell as in Example 1. The results are shown in Table 2.

Comparative Example 2

A block or flake form of silicon oxide, analyzed to be completely amorphous by x-ray diffractometry, was milled on a ball mill and then a bead mill using hexane as a dispersing medium. By passing the resulting suspension through a filter and removing the solvent in a nitrogen atmosphere, a powder having an average particle size of about 1 μm was obtained. The powder had a content of zero-valent silicon fine particles of 31% by weight, but particles were free of voids.

The silicon oxide fine powder was evaluated as the negative electrode active material for a lithium ion secondary cell as in Example 1. The results are shown in Table 2.

TABLE 2

|  | Example | | Comparative Example |
|---|---|---|---|
|  | 4 | 5 | 2 |
| Starting material | Silicon-silicon dioxide composite | Silicon oxide | Silicon oxide |
| Primary particles* (μm) | 1.0 | 1.0 | 1.0 |
| Secondary particles* (μm) | 10 | 10 | 1.0 |
| Initial charge capacity** (mAh/g) | 930 | 910 | 780 |
| Initial efficiency (%) | 74 | 73 | 60 |
| Retention at 50th cycle (%) | 93 | 94 | 15 |

*"Primary particles" means a mean particles size of the starting fine particles and "Secondary particles" means a mean particles size of the resulting composite particles, and so.
**The capacity is calculated based on the negative electrode film weight.

Example 6

A block or flake form of silicon oxide was milled on a ball mill and then a bead mill using hexane as a dispersing medium. By passing the resulting suspension through a filter and removing the solvent in a nitrogen atmosphere, a powder having an average particle size of about 1 μm was obtained. To 100 g of the silicon oxide powder were added a curable siloxane composition comprising 12 g of tetramethyltetravinylcyclotetrasiloxane (LS-8670, Shin-Etsu Chemical Co., Ltd.), 8 g of methylhydrogensiloxane (KF-99, Shin-Etsu Chemical Co., Ltd.) and 0.1 g of a platinum catalyst (1% chloroplatinic acid solution), and 30 ml of hexane. The mixture was fully mixed in patty form. The mixture was dried at 60° C. and heat cured at 200° C. for one hour.

The cured product was comminuted on a grinder (Masscolloider) with a set clearance of 20 μm, granulating silicon-containing particles having an average particle size of about 10 μm (content of zero-valent silicon fine particles: 28% by weight, void content: 25% by volume as determined from a specific gravity measurement).

Using a vertical tubular furnace (inner diameter ~50 mm), the silicon-containing particles thus granulated were subjected to thermal CVD in a methane-argon mixture stream at 1,200° C. for 3 hours. The conductive silicon composite thus obtained was disintegrated in an automated mortar. The conductive silicon composite powder had a carbon content of 15%, an active silicon content of 28.1%, and an average particle size of 13 μm. The silicon crystal grains dispersed in silicon dioxide had a size of about 60 nm as determined by Scherrer method.

[Cell Test]

The evaluation of a conductive silicon composite as the negative electrode active material for a lithium ion secondary cell was carried out by the following procedure which was common to Example 6 and Comparative Example 3. A negative electrode material mixture was obtained by adding synthetic graphite (average particle diameter $D_{50}$=5 μm) to the carbon-coated silicon composite obtained above so as to give a total free carbon content of 40% (carbon of synthetic graphite plus carbon deposited on silicon composite). To the mixture, polyvinylidene fluoride was added in an amount of 10% of the resulting mixture. N-methylpyrrolidone was then added thereto to form a slurry. The slurry was coated onto a copper foil of 20 μm gage and dried at 120° C. for one hour. Using a roller press, the coated foil was shaped under pressure into an electrode sheet, of which 2 cm² discs were punched out as the negative electrode. The subsequent procedure is the same as in Example 1.

The results of evaluation of the silicon composite fine powder as the negative electrode active material for a lithium ion secondary cell are shown in Table 3.

Comparative Example 3

As in Example 6, a block or flake form of silicon oxide was milled on a ball mill and then a bead mill using hexane as a dispersing medium. By passing the resulting suspension through a filter and removing the solvent in a nitrogen atmosphere, a powder having an average particle size of about 1 μm (void content 0% by volume) was obtained. Using a vertical tubular furnace (inner diameter ~50 mm), 100 g of the silicon oxide powder was subjected to thermal CVD in a methane-argon mixture stream at 1,200° C. for 5 hours. The conductive silicon composite thus obtained was disintegrated in an automated mortar. The conductive silicon composite powder had a carbon content of 17%, a zero-valent active silicon content of 25%, and an average particle size of 13 μm. The silicon crystal grains dispersed in silicon dioxide had a size of about 65 nm as determined by Scherrer method.

The silicon composite fine particles were evaluated as the negative electrode active material for a lithium ion secondary cell as in Example 6. The results are shown in Table 3.

TABLE 3

|  | Example 6 | Comparative Example 3 |
| --- | --- | --- |
| Starting material | Silicon oxide | Silicon oxide |
| Primary particles* (μm) | 1.0 | 1.0 |
| Secondary particles* (μm) | 10 | 1.7 |
| Carbon coating weight (%) | 15 | 17 |
| Initial charge capacity** (mAh/g) | 910 | 850 |
| Initial efficiency (%) | 78 | 76 |
| Retention at 50th cycle (%) | 98 | 79 |

*"Primary particles" means a mean particles size of the starting fine particles and "Secondary particles" means a mean particles size of the resulting composite particles, and so.
**The capacity is calculated based on the negative electrode film weight.

Example 7

Metallic silicon of chemical grade (low Al silicon available from SIMCOA Operations Pty. Ltd., Australia, Al 0.05%, Fe 0.21%, Ca 0.003%) was crushed on a jaw crusher, and milled on a ball mill and then a bead mill using hexane as a dispersing medium until fine particles having an average particle size of about 1 μm were obtained. By passing the resulting suspension through a filter, removing the solvent in a nitrogen atmosphere, and cutting off a fraction of coarse particles by a pneumatic precision classifier (Nisshin Engineering Co., Ltd.), a silicon powder having an average particle size of about 0.8 μm was obtained. 100 g of the silicon fine powder was combined with 80 g of globular graphite powder MCMB06-28 (Osaka Gas Chemical Co., Ltd., average particle size 6 μm). To this were added a curable siloxane composition comprising 12 g of tetramethyltetravinylcyclotetrasiloxane (LS-8670, Shin-Etsu Chemical Co., Ltd.), 8 g of methylhydrogensiloxane (KF-99, Shin-Etsu Chemical Co., Ltd.) and 0.1 g of a platinum catalyst (1% chloroplatinic acid solution), and 30 ml of hexane. The mixture was fully mixed in patty form. The mixture was then dried and pre-cured at 60° C.

The mixture in mass form was placed in an alumina container, which was closed with a lid, and fired in an atmosphere-controllable, temperature-programmable muffle furnace in a nitrogen atmosphere according to a temperature profile of 300° C. for 2 hours and then 1,000° C. for 3 hours. After cooling, the fired product was comminuted on a grinder (Masscolloider) with a set clearance of 20 μm, yielding silicon-carbon composite particles having an average particle size of about 15 μm (content of zero-valent silicon fine particles: 55% by weight, void content: 28% by volume as determined from a specific gravity measurement, carbon content: 40% by weight).

The cell test was the same as in Example 1. A lithium ion secondary cell assembled using the silicon-carbon composite powder was determined for initial efficiency. The charge/discharge test was carried out 50 cycles. The test results are shown in Table 4. It is noted that the capacity is calculated based on the negative electrode film weight.

Example 8

As in Example 7, a silicon powder having an average particle size of about 0.8 μm was obtained. 100 g of the silicon fine powder was combined with 80 g of flaky synthetic graphite powder SGP10 (SCE, average particle size 10 μm). To this were added a curable siloxane composition comprising 12 g of tetramethyltetravinylcyclotetrasiloxane (LS-8670, Shin-Etsu Chemical Co., Ltd.), 8 g of methylhydrogensiloxane (KF-99, Shin-Etsu Chemical Co., Ltd.) and 0.1 g of a platinum catalyst (1% chloroplatinic acid solution), and 30 ml of hexane. The mixture was fully mixed in patty form. The mixture was then dried and pre-cured at 60° C.

The mixture in mass form was placed in an alumina container, which was closed with a lid, and fired in an atmosphere-controllable, temperature-programmable muffle furnace in a nitrogen atmosphere according to a temperature profile of 300° C. for 2 hours and then 1,000° C. for 3 hours. After cooling, the fired product was comminuted on a grinder (Masscolloider) with a set clearance of 20 μm, yielding silicon-carbon composite particles having an average particle size of about 15 μm (content of zero-valent silicon fine particles: 53% by weight, void content: 25% by volume as determined from a specific gravity measurement, carbon content: 42% by weight).

The silicon-carbon composite powder was evaluated as the negative electrode active material for a lithium ion secondary cell as in Example 7. The results are shown in Table 4.

Example 9

About 100 g of the silicon-carbon composite powder having an average particle size of about 15 μm, prepared in Example 7, was placed in a vertical reactor of alumina having an inner diameter of about 30 mm where it was heated to 1,150° C. in an argon stream. Then the atmosphere was changed to a methane-argon (30% methane) mixture, after which thermal CVD was carried out for 3 hours. After cooling, the silicon-carbon composite thus obtained was disintegrated in an automated mortar. The conductive silicon-carbon composite powder had an average particle size of about 15 μm, a zero-valent silicon content of 49% by weight, a graphite content of 36% by weight, and a CVD carbon content of 14%, while the void content after CVD was unmeasurable.

The silicon-carbon composite powder was evaluated as the negative electrode active material for a lithium ion secondary cell as in Example 7. The results are shown in Table 4.

Comparative Example 4

Metallic silicon of chemical grade (low Al silicon available from SIMCOA Operations Pty. Ltd., Australia, Al 0.05%, Fe 0.21%, Ca 0.003%) was crushed on a jaw crusher, and milled on a ball mill and then a bead mill using hexane as a dispersing medium until fine particles having an average particle size of about 1 μm were obtained. By passing the resulting suspension through a filter, removing the solvent in a nitrogen atmosphere, and cutting off a fraction of coarse particles by a pneumatic precision classifier (Nisshin Engineering Co., Ltd.), a silicon powder having an average particle size of about 0.8 μm was obtained. This powder had no voids since it had not been granulated.

The silicon fine powder having a narrow particle size distribution with the fraction of coarse particles cut off was subjected to thermal CVD in methane as in Example 9, yielding carbon-coated silicon powder having a carbon content of about 15%.

The silicon powder was evaluated as the negative electrode active material for a lithium ion secondary cell as in Example 7. The results are shown in Table 4.

TABLE 4

|  | Example 7 | Example 8 | Example 9 | Comparative Example 4 |
|---|---|---|---|---|
| Carbon deposited (wt %) | 0 | 0 | 14 | 15 |
| Initial charge capacity* (mAh/g) | 1330 | 1370 | 1210 | 1950 |
| Initial efficiency (%) | 92 | 90 | 89 | 91 |
| Retention at 50th cycle (%) | 92 | 87 | 90 | 5 |

*The capacity is calculated based on the negative electrode film weight.

Japanese Patent Application Nos. 2004-093074 and 2004-093169 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing composite particles, comprising:
sintering primary fine particles of silicon, silicon alloy, or silicon oxide having a size of 0.8 μm to 10 μm together with one or more organosilicon compounds, to obtain a sintered product; and
granulating said sintered product into silicon composite particles,
wherein each composite particle has a structure in which silicon or silicon alloy fine particles having a size of 0.8 μm to 10 μm are dispersed in a silicon-base inorganic compound resulting from sintering of said one or more organosilicon compound and said silicon-base inorganic compound serves as a binder, and said composite particles have a size of 0.5 to 30 μm and contain 1 to 90% by weight of said silicon or silicon alloy, and
wherein voids are present within said composite particles with a void content of 5 to 70% by volume.

2. The method of claim 1, wherein said primary fine particles of silicon, silicon alloy, or silicon oxide have a size of 0.8 μm to 10 μm, and said silicon-base inorganic compound is an Si—C—O composite, an Si—C—N composite, $SiN_x$, $SiO_y$, $SiC_z$, or a mixture thereof, wherein x, y and z are positive numbers in the range: $0<x \leq 4/3$, $0<y \leq 2$, and $0<z \leq 1$.

3. The method of claim 1, wherein said one or more organosilicon compound is a reactive organosilicon compound having a crosslinkable group or a curable polysiloxane composition, and
said method comprises mixing the reactive organosilicon compound or curable polysiloxane composition with primary fine particles of silicon or silicon alloy;
effecting heat curing or catalytic reaction for curing into a crosslinked product;
heating and sintering the crosslinked product at a temperature in the range of 500 to 1,400° C. in an inert gas stream, to become inorganic; and
comminuting the inorganic product to a size of 0.5 to 30 μm.

4. The method of claim 3, wherein said reactive organosilicon compound having a crosslinkable group is at least one member selected from the group consisting of a compound of formula (1), a compound of formula (2), a compound of formula (3), a compound of formula (4), a compound of formula (5), and mixtures thereof:

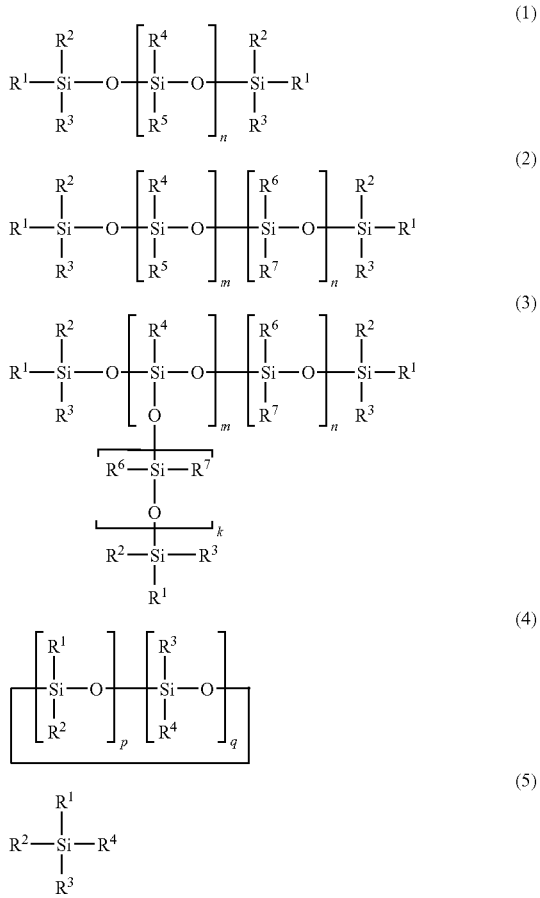

wherein $R^1$ to $R^7$ are each independently a hydrogen atom, hydroxyl group, hydrolyzable group, or monovalent hydrocarbon group, at least two substituent groups attached to silicon atoms are hydrogen atoms, hydroxyl groups, hydrolyzable groups, or aliphatic unsaturated hydrocarbon groups, m, n and k are numbers of 0 to 2,000, p and q are numbers of 0 to 10, excluding p = q = 0.

5. The method of claim 3, wherein said reactive organosilicon compound having a crosslinkable group is a silane or siloxane represented by the average formula: $C_hH_iSiO_jN_k$ wherein h, i and j are positive numbers, k is 0 or a positive number, and (h-j) is more than 0, and having at least one crosslinkable site per 4 silicon atoms.

6. The method of claim 3, wherein said curable polysiloxane composition is an addition-curable organopolysiloxane composition.

7. The method of claim 1, further comprising:
previously treating said primary fine particles of silicon or silicon alloy with at least one surface treating agent selected from the group consisting of a silane coupling agent, a hydrolytic condensate of a silane coupling agent, a partial hydrolytic condensate of a silane coupling agent, a silylating agent, a silicone resin, and mixtures thereof.

8. A method of preparing conductive composite particles, comprising:
heat treating composite particles prepared by a method according to claim 1, in an atmosphere containing an organic matter gas and/or vapor at a temperature of 800 to 1,400° C., to thereby coat surfaces of said composite particles.

9. A method for preparing composite particles, comprising:
sintering primary fine particles of silicon, silicon alloy, or silicon oxide having a size of 100 nm to 10 μm and primary fine particles of carbon together with one or more organosilicon compounds, to obtain a sintered product; and
granulating said sintered product into silicon-carbon composite particles,
wherein each composite particle has a structure in which silicon or silicon alloy fine particles and carbon fine particles are dispersed in a silicon-base inorganic compound resulting from sintering of said one or more organosilicon compound and said silicon-base inorganic compound serves as a binder, and said composite particles have a size of 0.5 to 30 μm and contain 1 to 90% by weight of said silicon or silicon alloy, and
wherein voids are present within said composite particles.

10. The method of claim 9, wherein said primary fine particles of silicon, silicon alloy, or silicon oxide have a size of 100 nm to 10 μm, said primary fine particles of carbon have a size of 100 nm to 20 μm, and said silicon-base inorganic compound is an Si—C—O composite, an Si—C—N composite, $SiN_x$, $SiO_y$, $SiC_z$, or a mixture thereof, wherein x, y and z are positive numbers in the range: $0<x \leq 4/3$, $0<y \leq 2$, and $0<z \leq 1$.

11. The method of claim 9, wherein said primary fine particles of carbon are natural or synthetic graphite in globular or flake form.

12. The method of claim 9, wherein said one or more organosilicon compound is a reactive organosilicon compound having a crosslinkable group or a curable polysiloxane composition, and
said method comprises mixing the reactive organosilicon compound or curable polysiloxane composition with primary fine particles of silicon or silicon alloy;
effecting heat curing or catalytic reaction for curing into a crosslinked product;
heating and sintering the crosslinked product at a temperature in the range of 500 to 1,400° C. in an inert gas stream, to become inorganic; and
comminuting the inorganic product to a size of 0.5 to 30 μm.

13. The method of claim 12, wherein said reactive organosilicon compound having a crosslinkable group is at least one member selected from the group consisting of a compound of formula (1), a compound of formula (2), a compound of formula (3), a compound of formula (4), a compound of formula (5), and mixtures thereof:

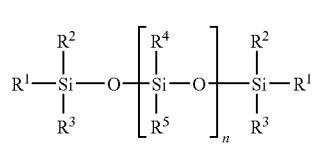

(1)

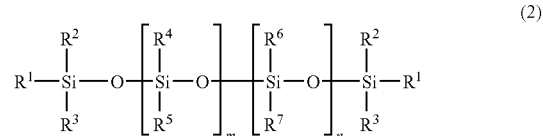

(2)

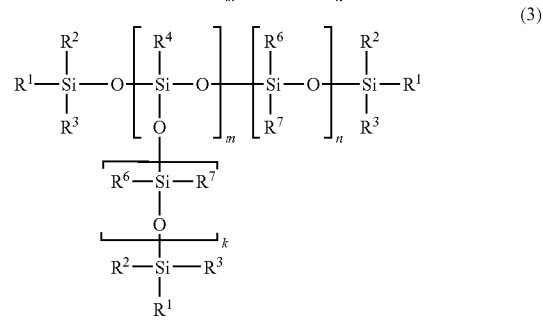

(3)

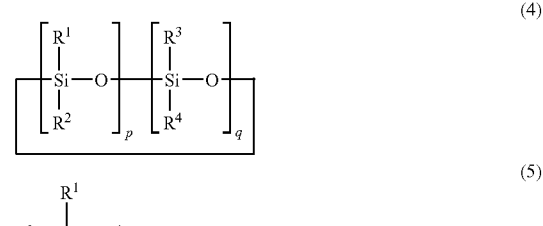

(4)

(5)

wherein $R^1$ to $R^7$ are each independently a hydrogen atom, hydroxyl group, hydrolyzable group, or monovalent hydrocarbon group, at least two substituent groups attached to silicon atoms are hydrogen atoms, hydroxyl groups, hydrolyzable groups, or aliphatic unsaturated hydrocarbon groups, m, n and k are numbers of 0 to 2,000, p and q are numbers of 0 to 10, excluding p =q =0.

14. The method of claim 12, wherein said reactive organosilicon compound having a crosslinkable group is a silane or siloxane represented by the average formula: $C_hH_iSiO_jN_k$ wherein h, i and j are positive numbers, k is 0 or a positive number, and (h-j) is more than 0, and having at least one crosslinkable site per 4 silicon atoms.

15. The method of claim 12, wherein said curable polysiloxane composition is an addition-curable organopolysiloxane composition.

16. The method of claim 9, further comprising:
previously treating said primary fine particles of silicon or silicon alloy with at least one surface treating agent selected from the group consisting of a silane coupling agent, a hydrolytic condensate of a silane coupling agent, a partial hydrolytic condensate of a silane coupling agent, a silylating agent, and a silicone resin, and mixtures thereof.

17. A method of preparing conductive composite particles, comprising:
heat treating composite particles prepared by a method according to claim 9, in an atmosphere containing an organic matter gas and/or vapor at a temperature of 800 to 1,400° C., to thereby coat surfaces of said composite particles.

* * * * *